United States Patent
Goto et al.

(10) Patent No.: US 7,212,285 B2
(45) Date of Patent: May 1, 2007

(54) OPTICAL MEASUREMENT DEVICE

(75) Inventors: Ryosuke Goto, Kawasaki (JP);
Motoyoshi Sekiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 178 days.

(21) Appl. No.: 10/992,014

(22) Filed: Nov. 19, 2004

(65) Prior Publication Data

US 2006/0012786 A1 Jan. 19, 2006

(30) Foreign Application Priority Data

Jul. 14, 2004 (JP) ............................. 2004-206711

(51) Int. Cl.
*G01J 3/28* (2006.01)
(52) U.S. Cl. .............. 356/328; 356/326; 356/329; 356/331; 356/332; 359/232
(58) Field of Classification Search ............... 356/328, 356/308, 329, 309; 359/738, 739; 398/26
See application file for complete search history.

(56) References Cited

U.S. PATENT DOCUMENTS 5,177,560 A * 1/1993 Stimple et al. ............. 356/308
5,880,833 A * 3/1999 Iwasaki ...................... 356/328
6,865,030 B2 * 3/2005 Berto et al. ................. 359/738
6,952,529 B1 * 10/2005 Mittal ........................ 398/26

FOREIGN PATENT DOCUMENTS

JP 7-8736 2/1995

* cited by examiner

*Primary Examiner*—Frank G. Font
*Assistant Examiner*—Guy G. Anderson
(74) *Attorney, Agent, or Firm*—Staas & Halsey LLP

(57) ABSTRACT

An optical measurement device capable of improving optical spectrum measurement accuracy without the need to structurally decrease a slit width. A diffraction grating for dispersing measurement light into respective different wavelengths is rotated in a given direction to produce diffracted light of selected wavelengths. A focusing lens converges the diffracted light to produce a converged beam. A slit control section varies the slit width at a constant scan speed to open or close the slit, thereby varying the passing bandwidth for the converged beam. A light receiving/measuring section receives the light passed through the slit, obtains a level function indicative of the power level of the received light that varies with change in optical frequency, and differentiates the level function by the scan speed to reproduce the spectrum profile of the measurement light.

2 Claims, 22 Drawing Sheets

SLIT WIDTH

OPTICAL MEASUREMENT DEVICE

CROSS-REFERENCE TO RELATED APPLICATIONS

This application is based upon and claims the benefits of priority from the prior Japanese Patent Application No. 2004-206711, filed on Jul. 14, 2004, the entire contents of which are incorporated herein by reference.

BACKGROUND OF THE INVENTION (1) Field of the Invention

The present invention relates to an optical measurement device, and more particularly, to an optical measurement device for measuring an optical spectrum.

(2) Description of the Related Art

With recent increase in the amount of communicated information, large-capacity, low-cost optical fiber communication systems have been actively developed. To cope with increasing capacity, WDMs (Wavelength Division Multiplexers) for multiplexing a plurality of wavelengths for transmission have been researched and developed, making the degree of multiplexing higher and higher.

Channel (ch) spacing, which is an index of the multiplexing degree, is standardized by ITU-T. In current ordinary WDM systems, signal with a transmission rate of 10 Gbps per channel is generally multiplexed with a spacing of 100 GHz (about 0.8 nm) or 50 GHz (about 0.4 nm).

In such WDM systems, EDFA (Erbium-Doped Fiber Amplifier), which is an optical amplifier using an erbium ($Er^{3+}$)-doped fiber (EDF) as an amplification medium, is generally used as a repeater, in order to compensate for the line loss caused during the transmission of optical signal over the optical fiber.

With EDFA, optical signal is allowed to propagate with pump light introduced into the EDF so that the optical signal level may be amplified by the stimulated emission then induced. In optical amplifiers utilizing stimulated emission as the principle of amplification like the EDFA, spontaneous emission takes place irrespective of the presence/absence of input optical signal. Thus, in a system using an EDFA, amplified spontaneous emission (ASE) caused in the amplifier constitutes noise, which deteriorates the bit error rate (BER).

Accordingly, at the stage of system design, OSNR (Optical Signal/Noise Ratio), which is expressed as the ratio in level of optical signal (S) to optical noise (N), needs to be evaluated by using an optical spectrum analyzer as an optical measurement device. What is important in high-accuracy measurement is in what manner optical noise is separated from optical signal to obtain accurate levels of the noise and signal.

In the case of measuring a signal spectrum with an optical spectrum analyzer, an optical spectrum that ought to be shown as thin lines is displayed as a thick line if the spectrum analyzer does not have sufficiently high resolving power, with the result that the tails spread and overlap with adjacent channels, making it impossible to distinguish the optical noise and signal from each other (given two spectral lines of wavelengths $\lambda_0$ and $\lambda_0+\Delta\lambda_0$ (or frequencies $f_0$ and $f_0+\Delta f_0$), the resolving power represents the smallest value of $\Delta\lambda_0$ (or $\Delta f_0$) where the two wavelengths (or frequencies) can be distinguished from each other as two discrete spectral lines).

Especially, in 10-Gbps NRZ (Non-Return to Zero)-modulated WDM systems, the tails of adjacent signal spectra overlap with each other from the outset where the ch spacing is 50 GHz, making it more difficult to distinguish optical noise and signal from each other. Accordingly, an optical spectrum analyzer with extremely high resolving power is needed to measure the OSNR with high accuracy.

Currently, optical spectrum analyzers for use in this field generally adopt dispersion spectroscopy using a monochromator (light dispersion unit=diffraction grating). Also, as techniques for improving the resolving power for an optical spectrum, there has been proposed a conventional technique wherein an intersecting slit is arranged at the slit position so that light spot components scattering in the Y-axis direction may be cut off, to thereby enhance the resolving power (see, for example, Unexamined Japanese Utility Model Publication No. H07-8736 (paragraph nos. [0013] to [0027], FIG. 1)).

Conventional dispersion spectroscopy-type optical spectrum analyzers use a method in which measurement light to be measured is dispersed by a diffraction grating and a part thereof is extracted through a slit to monitor its power. Specifically, a measurement method is employed wherein the slit is fixed with its width decreased to the smallest possible value and the diffraction grating for dispersing the measurement light is rotated to vary the wavelength band of light passing through the slit, thereby measuring the light intensities of the respective wavelength bands.

FIG. 21 illustrates the width of a beam waist formed by a lens. Generally, the focal point to which the rays of light are converged by a lens has a finite spot width, of which the theoretical minimum value is $W=(4\cdot\lambda\cdot L)/(\pi\cdot d)$.

FIG. 22 shows the arrangement of a spectrum analyzer. In the illustrated arrangement, if $d_0=5$ cm, $L_0=30$ cm and $\lambda=1550$ nm, for example, the spot width is 6 μm. To achieve high resolving power, therefore, the slit width at the light receiving section also needs to be equal to a minimum width of 6 μm. However, the above spot width is a theoretical limit value and in actuality has a greater value, taking the precision of the system and lens shapes, the precision of the diffraction grating, etc. into consideration.

Accordingly, to realize high-resolution optical spectrum measurement, a slit with an extremely small width is needed. It is, however, difficult to obtain an extremely small slit width for structural reasons, giving rise to a problem that it is difficult to attain sufficiently high resolving power.

The conventional technique (Unexamined Japanese Utility Model Publication No. H07-8736) also has an identical basic structure in that the spectral resolving power is enhanced by decreasing the slit width, and thus is unable to achieve sufficiently high resolving power.

SUMMARY OF THE INVENTION

The present invention was created in view of the above circumstances, and an object thereof is to provide an optical measurement device which is capable of measuring an optical spectrum with high resolving power, without structurally decreasing the slit width, and thus is improved in accuracy of the optical spectrum measurement.

To achieve the object, there is provided an optical measurement device comprising light dispersion means for dispersing incident light into output beams emerging at different angles corresponding to respective optical frequencies thereof, optical means for passing part of the output beams therethrough, the optical means being capable of varying an optical frequency band of light passed therethrough, a control section for controlling the optical means to change the optical frequency band of the passed light, and a light receiving/measuring section for receiving the light passed through the optical means and measuring power of the received light corresponding to the change of the optical frequency band.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
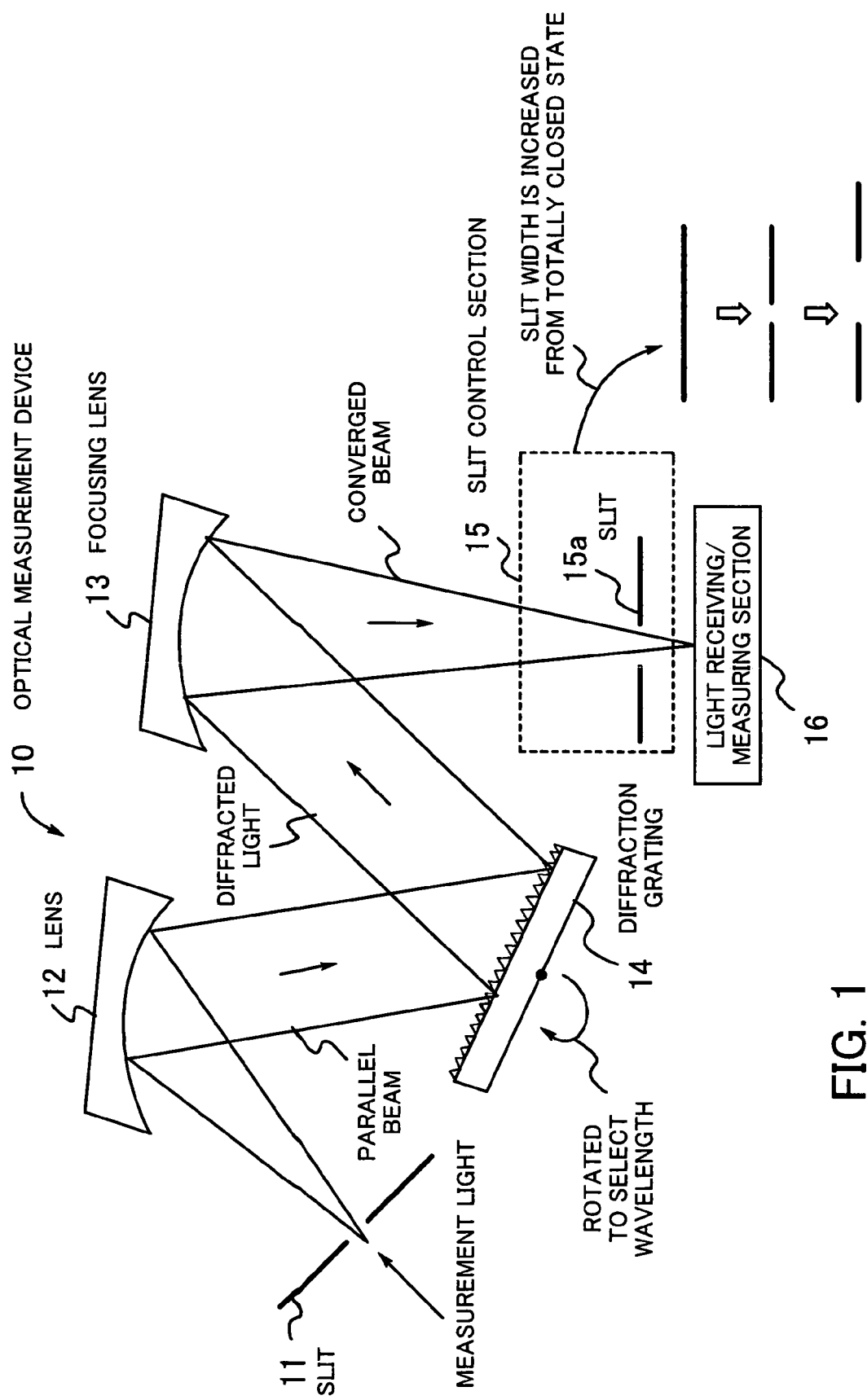
FIG. 1 is a diagram illustrating the principle of an optical measurement device according to the present invention.

Embodiments of the present invention will be hereinafter described with reference to the drawings. FIG. 1 illustrates the principle of an optical measurement device according to the present invention. An optical measurement device 10, which is a first embodiment of the present invention, comprises a slit 11, a lens 12, a focusing lens 13, a diffraction grating 14, a slit control section 15, and a light receiving/measuring section 16. The optical measurement device 10 corresponds to an optical spectrum analyzer and is used for the measurement of an optical spectrum. For example, the device is used to measure the optical power of light components contained in a certain frequency band of, for example, WDM light as measurement light to be measured, to obtain the OSNR.

After passing through the slit 11, the measurement light is reflected by the lens 12 and transformed into a parallel beam. The parallel beam then falls upon the diffraction grating 14 and is dispersed when emerging therefrom. Namely, the diffraction grating produces diffracted light whose components emerge at different angles corresponding to their respective wavelengths (frequencies). The diffraction grating 14 is an optical component having a plurality of grooves cut in a glass plate at regular intervals so that the angle (angle of diffraction) of light emerging therefrom may vary depending on the wavelength of incident light. Thus, where incident light contains a plurality of wavelength components, the diffraction grating acts as a light dispersion unit capable of separating the incident light into the respective wavelength components.

The focusing lens 13 converges the diffracted light to produce a converged beam and directs the converged beam of selected wavelength components toward a slit 15a. The slit control section 15 opens/closes the slit 15a at a constant speed by using a motor mechanism such as a micrometer, for example, to vary the slit width so that the bandwidth of passing wavelengths of the converged light directed toward the light receiving/measuring section 16 can be changed.

FIG. 1 illustrates the case of increasing the slit width at a constant speed from a totally closed state, but the slit width may be decreased from an open state. The speed of widening (or narrowing) the slit to open (or close) the slit 15a is the amount of change in the slit width per unit time. As the slit width changes, the detected wavelength band, or frequency band, of light reaching the light receiving/measuring section 16 after passing through the slit varies, and accordingly, the speed of widening (narrowing) the slit can be expressed as an optical frequency change ($\Delta f$ Hz) per unit time. In the following description, this optical frequency change per unit time is called "scan speed".

The light receiving/measuring section 16 is arranged at the focal point to which the converged light from the focusing lens 13 is focused, to receive the light passed through the slit 15a, of which the wavelength bandwidth varies as the slit width changes, and obtains a level function indicative of the power level of the received light varying with the time-based change of the slit width, that is, the optical frequency change. Then, the level function is differentiated by the scan speed (where the level function is S, dS/df is derived), to reproduce the spectrum profile of the measurement light.

The measurement light used in this embodiment is WDM light in which wavelengths are multiplexed. Thus, to obtain the spectrum of such WDM light used in WDM systems, the optical power of the whole wavelength band containing WDM optical signals need to be measured. In other words, it is necessary to measure a spectrum over a wide wavelength band. To this end, the diffraction grating 14 is rotated to change the diffraction angle of the diffracted light introduced to the focusing lens 13, whereby the wavelength band of light to be guided to the light receiving/measuring section 16 can be selected (changed). Namely, depending on the rotational angle of the diffraction grating 14, the spectrum of a different wavelength band can be obtained. Thus, by using the single slit 15a and the single light receiving/measuring section 16, it is possible to measure the optical power, or the spectrum, over a wide wavelength band.

Figure 2:
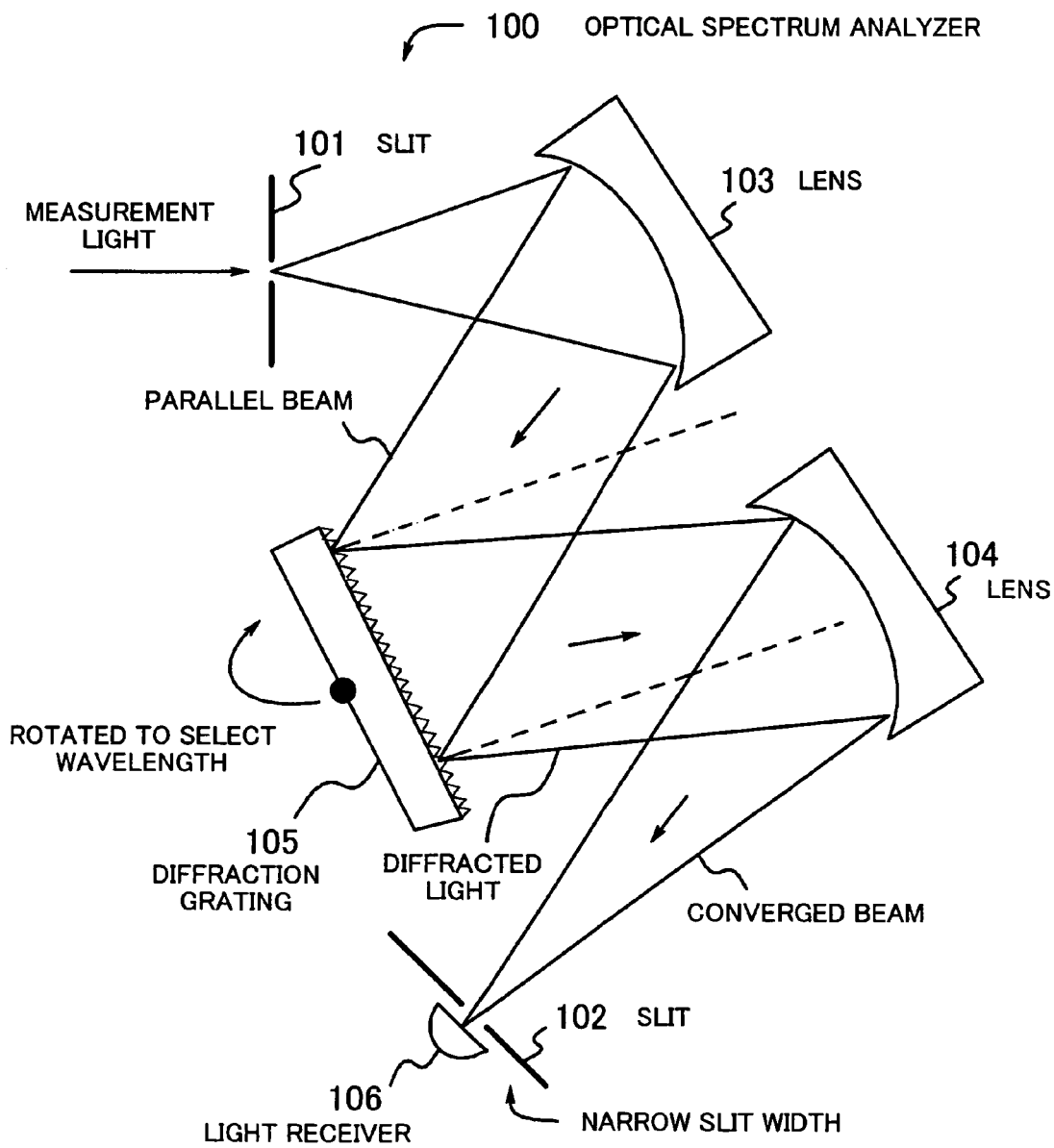
FIG. 2 is a diagram showing the arrangement of an optical spectrum analyzer.

Before proceeding to the detailed description of the present invention, the operation of a conventional optical spectrum analyzer and the problems to be solved by the present invention will be explained in detail. FIG. 2 shows the arrangement of an optical spectrum analyzer. The conventional optical spectrum analyzer 100 comprises slits 101 and 102, lenses 103 and 104, a diffraction grating 105, and a light receiver 106.

The process in operation from the incidence of measurement light upon the slit 101 to the introduction of diffracted light, which has been diffracted at an angle corresponding to the selected wavelength band, into the slit 102 as a converged beam is identical with that explained above with reference to FIG. 1. The slit 102 selectively passes the converged beam of specific wavelength band therethrough. The light receiver 106 receives the converged beam of the selected wavelength band and measures optical power thereof. In order to enhance the resolving power, the optical spectrum analyzer 100 is constructed such that the width of the slit 102 is as narrow as possible.

Figure 3:
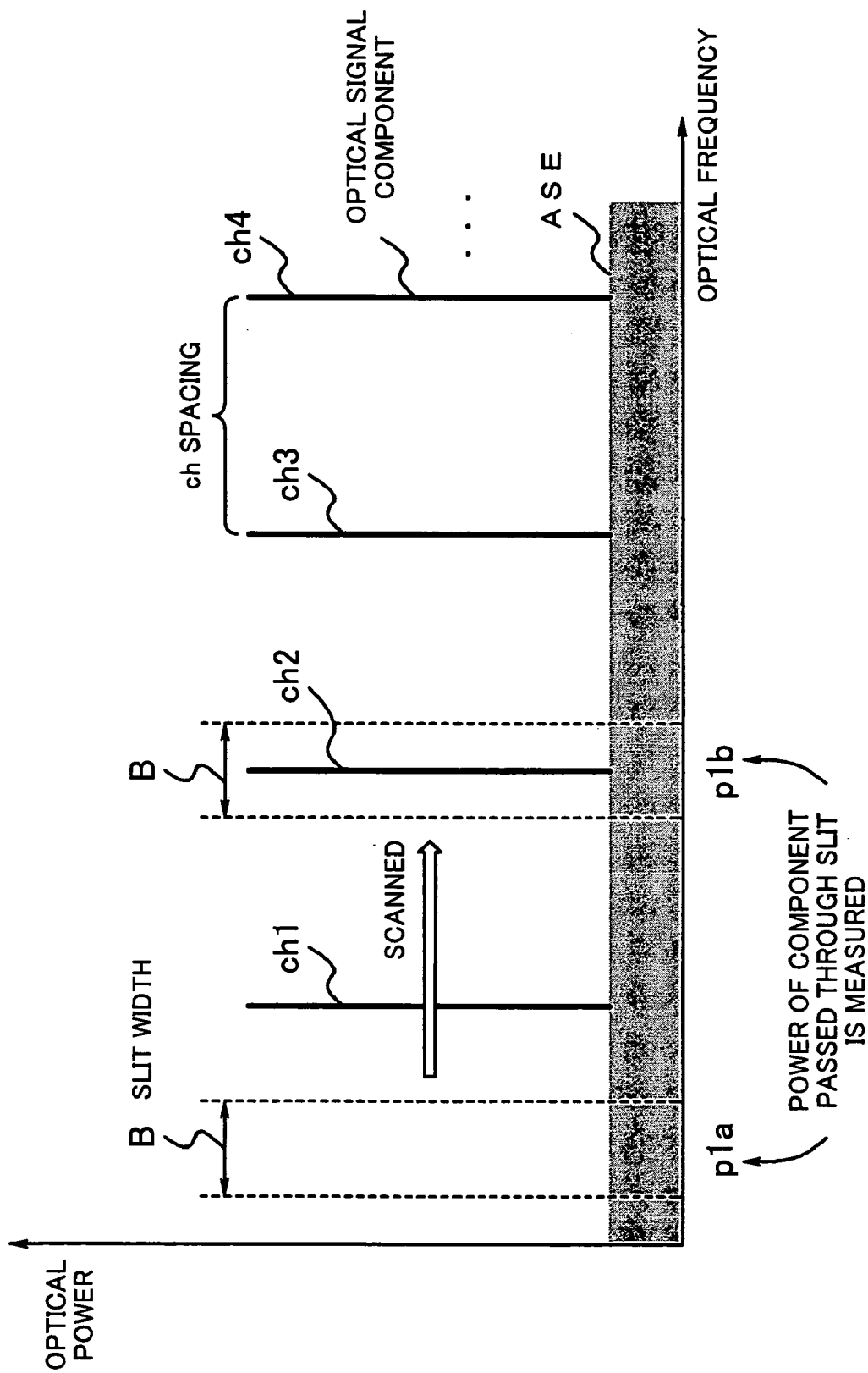
FIG. 3 is a graph showing an optical spectrum.

FIG. 3 shows an exemplary spectrum of measurement light, wherein the vertical axis indicates optical power and the horizontal axis indicates optical frequency. The illustrated example shows a spectrum of CW (Continuous Wave) optical signals (non-modulated optical signals on which no information is superimposed) separated with the ch spacing standardized by ITU-T, for example, as in WDM systems.

In WDM systems, multiple data to be transmitted are carried by respective different wavelengths of light (channels: ch) and are transmitted through a single optical fiber. The wavelengths (frequencies) of the respective channels are set like a grid such that adjacent channels are separated from each other by certain frequency spacing (ch spacing). The grid is called ITU-T Grid and is standardized as ITU-T recommendation. The optical signal of each channel consists of ASE light, which is noise, and an optical signal component.

When such WDM light as the measurement light is measured with the optical spectrum analyzer 100, the diffraction grating 105 is rotated to scan the wavelength band of light incident on the light receiver 106, so that the fixed slit width (width of the slit 102 arranged in front of the light receiver 106) B appears to move along the frequency axis.

On the other hand, the light receiver 106 keeps receiving light components present within the slit width B (components passed through the slit 102) to measure power thereof. When the slit width B is at position p1a, for example, the light component present in the width is ASE light only, and thus the power of the ASE light alone is measured. Also, when the slit width B is at position p1b, the ch2 optical signal (optical signal component+ASE) and ASE light on both sides of the ch2 optical signal are present in the width B, and accordingly, the power of these light components is measured.

Figure 4:
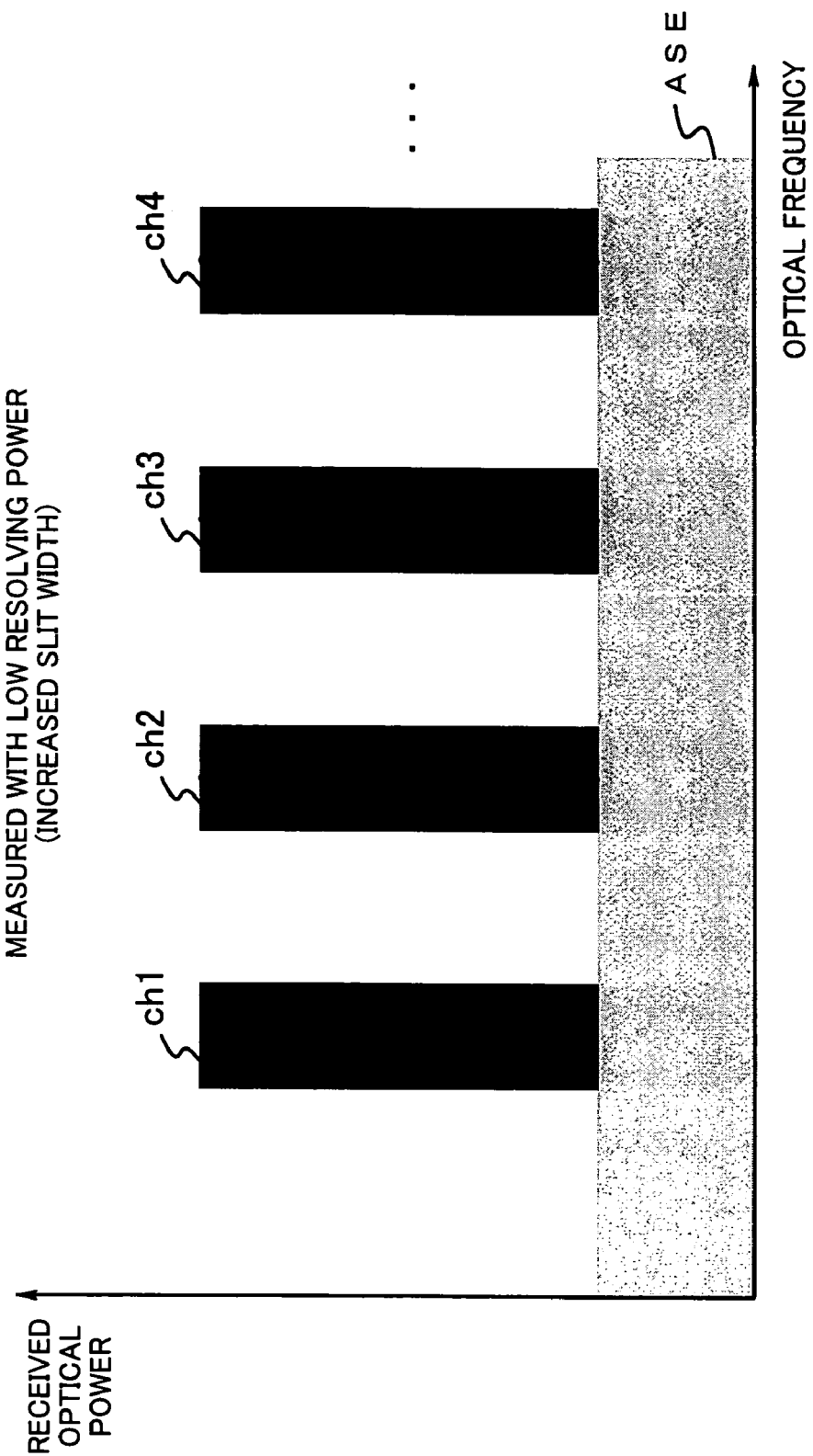
FIG. 4 is a graph showing a measured optical spectrum.
Figure 5:
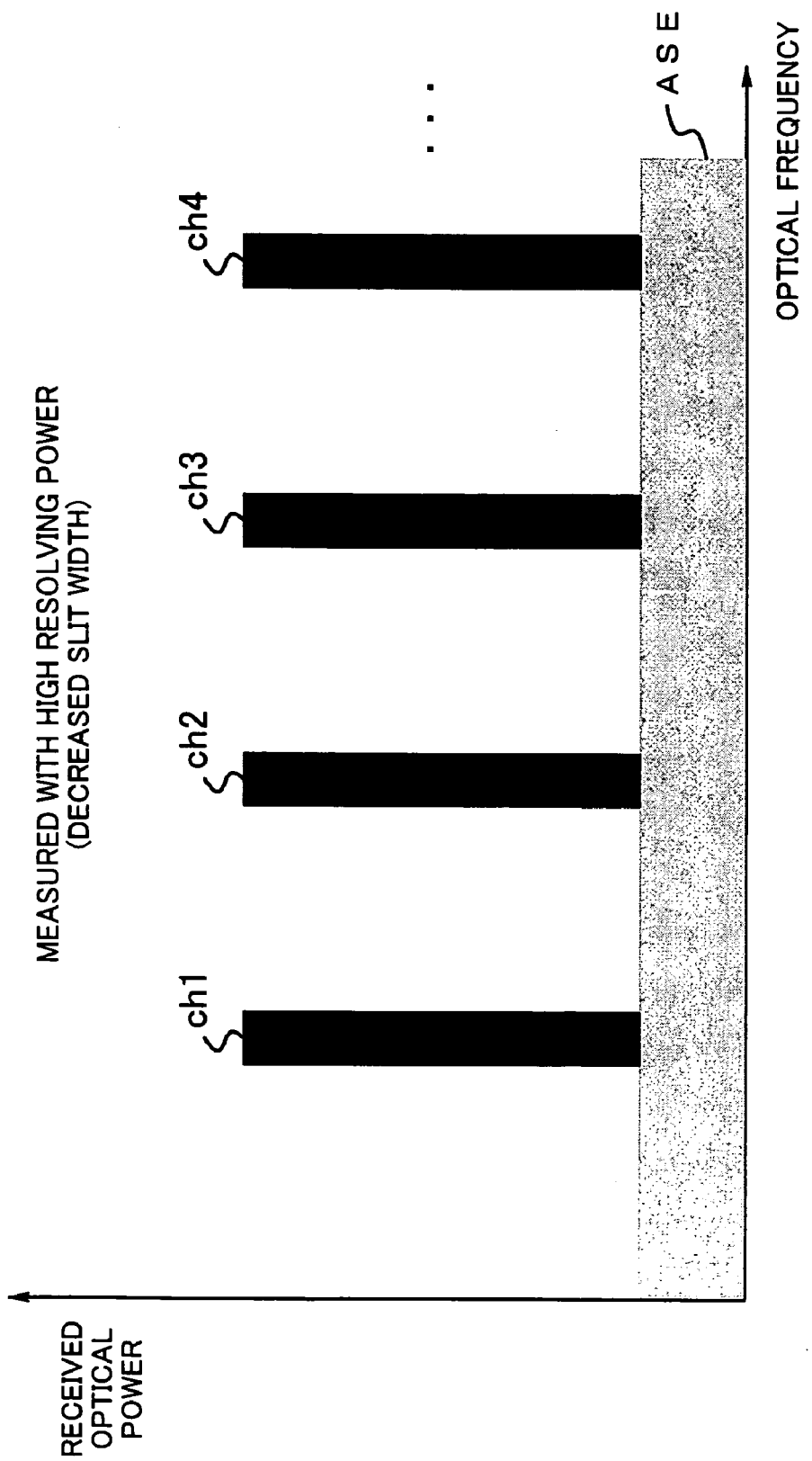
FIG. 5 is a graph also showing a measured optical spectrum.

FIGS. 4 and 5 each show a measured optical spectrum, wherein the vertical axis indicates the received optical power measured by the light receiver 106 and the horizontal axis indicates optical frequency. FIGS. 4 and 5 illustrate cases where a WDM signal having the spectrum shown in FIG. 3 was measured with the optical spectrum analyzer 100. Specifically, FIG. 4 shows the measurement results obtained with a large width of the slit 102, that is, with low resolving power, and FIG. 5 shows the measurement results obtained with a small width of the slit 102, that is, with high resolving power.

To measure the optical power distribution, or the spectrum, of the wavelength band shown in FIG. 3, the power is measured while scanning the wavelength band passed through the slit 102, and this is accomplished by rotating the diffraction grating 105 shown in FIG. 2.

Thus, as the slit 102 apparently moves to the right along the horizontal axis in FIG. 3, the power of the light components present in the slit width at the then-moved position is measured (measured in terms of area). The spectral width of each channel measured with a large slit width (FIG. 4) is greater than that measured with a small slit width (FIG. 5).

This indicates that with increase in the slit width, the resolving power with respect to frequency (wavelength) lowers.

Also, it is observed that the power level of the received ASE light is higher in FIG. 4 than in FIG. 5 (in FIG. 4, a greater area is measured for the ASE because the slit width is greater, and the size of the area is proportional to the height along the vertical axis). Thus, the smaller the slit width, the higher fidelity the measurement light can be reproduced with (the optical spectrum measured with a smaller slit width, shown in FIG. 5, is closer to the original spectrum profile shown in FIG. 3).

In the above, the line spectrum of CW signal is discussed; in actual WDM transmission, the light components of individual channels to be multiplexed are modulated at a certain bit rate to generate an optical signal in which information is superimposed for transmission. Due to the modulation, the optical spectrum of each channel spreads on both sides, as sidebands, with respect to the spectral peak before the modulation as the axis of symmetry. The widths of the sidebands increase with increase in the bit rate (with increase in the modulation frequency). Thus, in systems having large spectral widths because of a small grid width between adjacent channels and a high bit rate of optical signal, the sidebands of adjacent channels often overlap with each other. In current WDM systems commonly used, the NRZ (Non-Return-to-Zero) modulation scheme is used for a ch spacing of 50 GHz and a bit rate of 10 Gbit/second, and in such systems, the sidebands partly overlap with each other.

Figure 6:
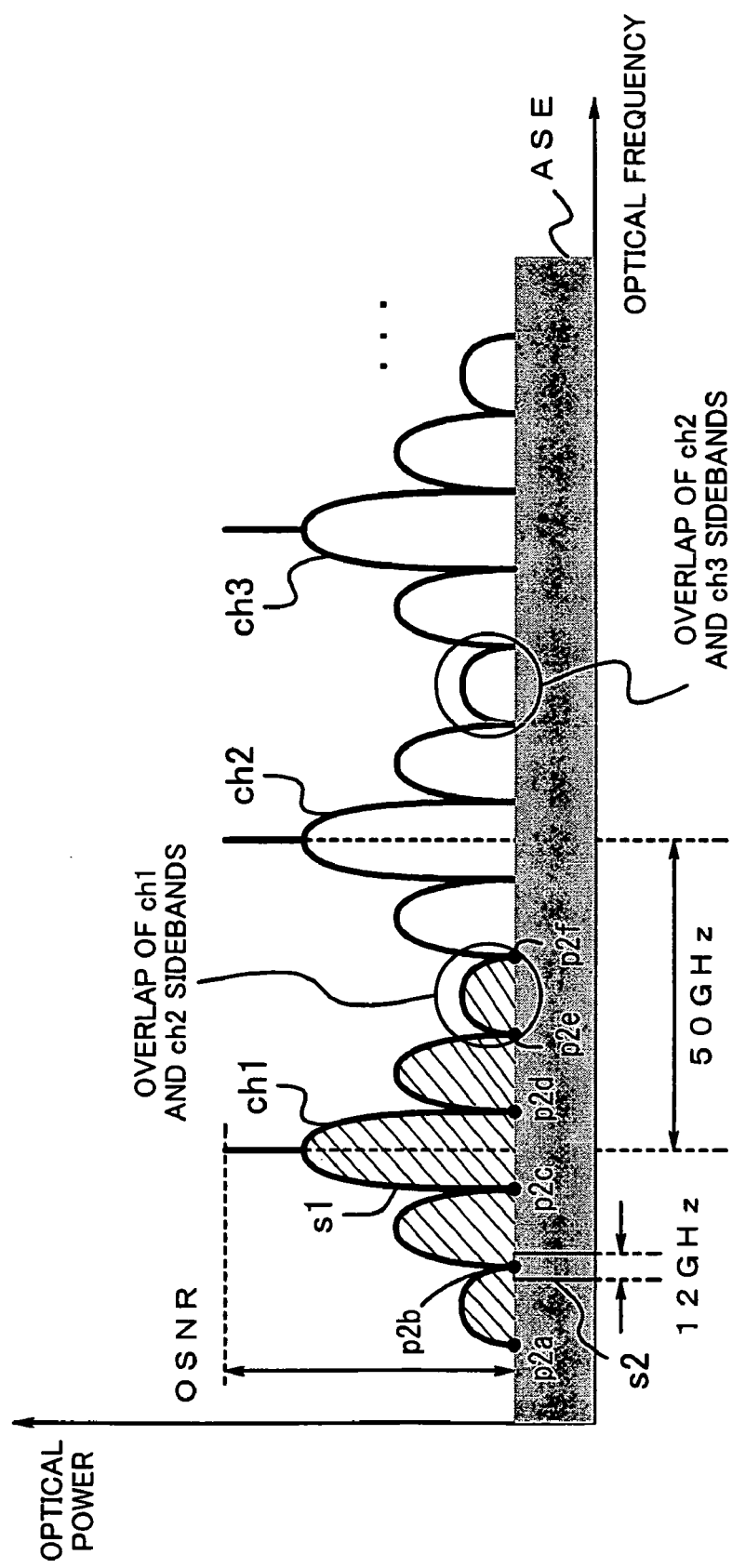
FIG. 6 is a graph showing a spectrum of WDM signal after modulation.

FIG. 6 schematically shows the spectrum of a modulated WDM signal, wherein the vertical axis indicates optical power and the horizontal axis indicates optical frequency. The illustrated waveform is that of a 10-Gbps NRZ-modulated signal with a ch spacing of 50 GHz, and as seen from FIG. 6, the spectrum of each channel is spread because of the modulation. In actual analysis of optical spectrum, the optical power of measurement light having such a waveform is measured to obtain the OSNR.

Figure 7:
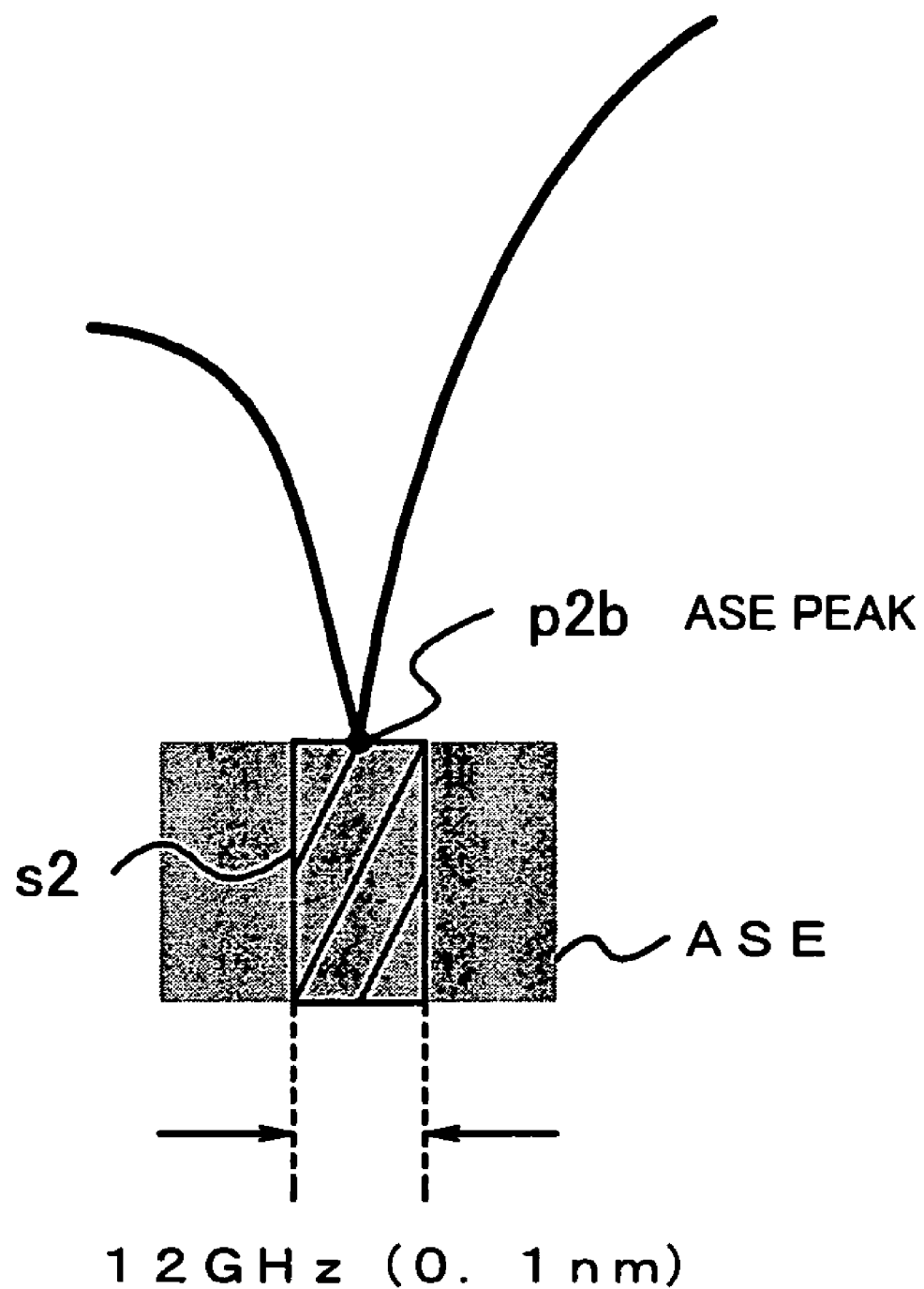
FIG. 7 is an enlarged view of a point and its surrounding part.

The OSNR is defined as the ratio of the total power of optical signal to the ASE power in a certain wavelength range. For ch1, for example, the total optical signal power corresponds to an area (in FIG. 6, hatched area) s1 of the optical signal component. The ASE power in a certain wavelength range (in this instance, defined as 0.1 nm (~12 GHz)) corresponds to an area s2 of the ASE component at, for example, point p2b (which may be any of points p2a to p2f) (point p2b and its surrounding part are shown in enlargement in FIG. 7). In this case, the OSNR of the ch1 optical signal is obtained by s1+s2, and the higher the OSNR, the greater the level range shown in FIG. 6 becomes relative to the ASE level range.

Accordingly, to measure the OSNR of measurement light with high accuracy, it is necessary to know the area under the envelope of the optical signal, namely, the total optical signal power and the peak of the ASE power. The total optical signal power can be measured by using a slit having a width equivalent to the spread width in the spectrum of the optical signal.

On the other hand, in order to locate the peak of the ASE power of a signal whose spectrum is spread due to modulation, an extremely small slit width is required because the profile of the measurement light needs to be reproduced with high fidelity.

Namely, in order to accurately locate the peak of the ASE power where the optical signal component is significantly small (points p2a to p2f) on the basis of the area of the light component present in the slit width, the slit width needs to be set to an extremely small value, otherwise it is not possible to locate the position where the area is at a minimum (i.e., the position corresponding to the peak of the ASE power).

Figure 8:
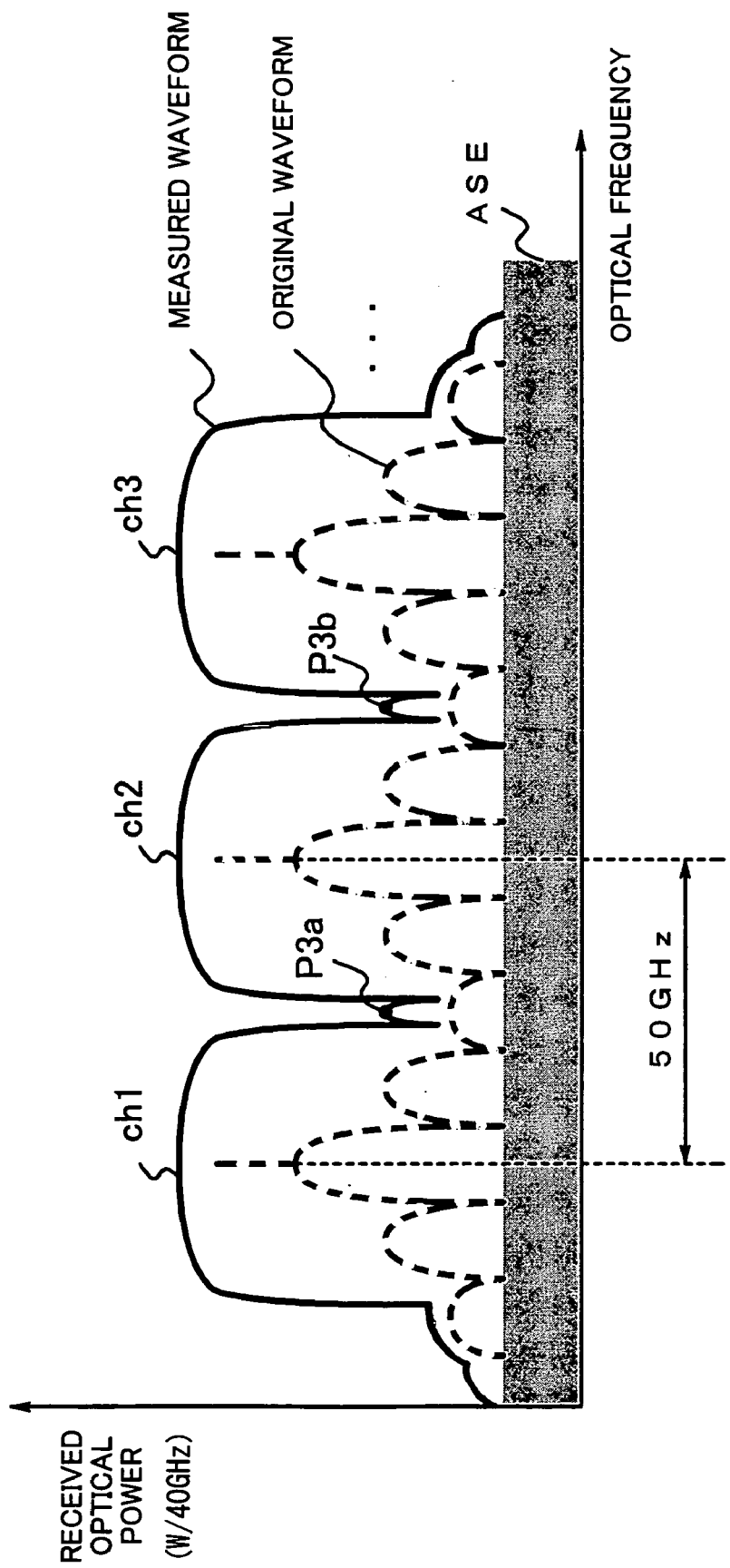
FIG. 8 is a graph showing a measured optical spectrum.
Figure 9:
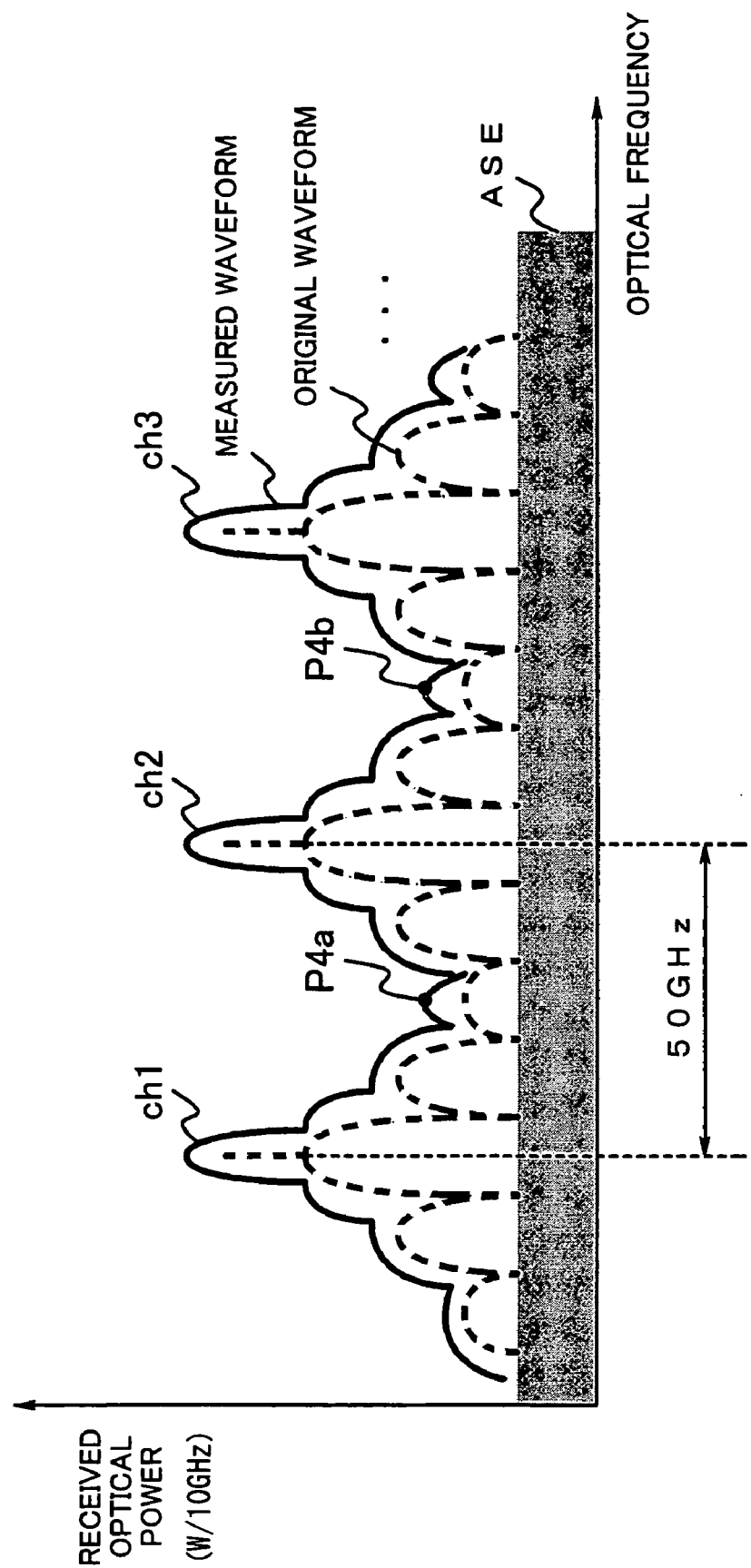
FIG. 9 is a graph also showing a measured optical spectrum.

FIGS. 8 and 9 each illustrate a measured optical spectrum, wherein the vertical axis indicates the received optical power measured by the light receiver 106 and the horizontal axis indicates optical frequency. In these instances, a WDM signal having the spectrum shown in FIG. 6 was measured with the optical spectrum analyzer 100, wherein FIG. 8 shows the measurement results obtained when the signal was scanned (the diffraction grating 105 was rotated) with the slit width set at 40 GHz in terms of frequency band, and FIG. 9 shows the measurement results obtained when the signal was scanned with the slit width set at 10 GHz in terms of frequency band.

In both cases shown FIGS. 8 and 9, the original WDM signal shown in FIG. 6 failed to be reproduced with satisfactory fidelity, and thus the OSNR cannot be measured with accuracy. Namely, in the case where the slit width is large (FIG. 8), the total optical signal power (e.g., in FIG. 8, represented by the value of the peak power of each channel) can be measured with accuracy since the slit width satisfactorily encompasses the spread width in the spectrum of the optical signal, but the ASE peak power becomes indistinct because of insufficient resolving power, making it impossible to calculate the OSNR. On the other hand, in the case where the slit width is small (FIG. 9), the total optical signal power becomes indefinite since the slit width does not encompass the whole spectrum of the optical signal which is spread due to modulation, and also the peak level of the ASE power at positions where the optical signal power is significantly low (points p2a to p2f) cannot be located with accuracy, making it impossible to calculate the OSNR.

In the conventional optical spectrum analyzer 100, therefore, the lowest one of the peak levels of multiple sidebands, which correspond to points p3a and p3b in FIG. 8 and points p4a and p4b in FIG. 9, is regarded as the peak of the ASE power and used to calculate the OSNR. In either case, the ASE power level fails to be accurately detected, with the result that the OSNR cannot be measured with accuracy.

Thus, the conventional spectrum analyzer employs a measurement method in which the signal is scanned (diffraction grating is rotated) with the slit width fixed, to calculate the power (area) of the light component passed through the slit, and the measurement accuracy depends on the narrowness of the slit width. Accordingly, to reproduce the profile of the measurement light with as high fidelity as possible, the slit width needs to be decreased to an extremely small value, but since it is difficult to produce an extremely narrow slit for structural reasons, high resolving power cannot be attained.

The present invention provides an optical measurement device which is capable of achieving high spectral resolving power by reproducing the spectrum profile with high accuracy, without using the method of structurally decreasing the slit width, thereby improving the optical spectrum measurement accuracy.

Operation according to the present invention will be now described in detail. According to the present invention, the slit control section 15 controls the slit 15a in a manner such that, for example, the slit is opened at a constant scan speed $\Delta f$ (Hz/s) from the totally closed state, to broaden the bandwidth of light passed through the slit 15a (the slit width is increased from the totally closed state during the time period in which the diffraction grating 14 keeps selecting one wavelength band before selecting the next wavelength band). In consequence, the power of light passed through the slit 15a varies by an amount corresponding to the increase in the slit width.

The light receiving/measuring section 16 receives the light passed through the slit 15a and measures the received optical power which varies depending on the scan speed (change in frequency). Then, the level function indicative of the level of the received optical power is obtained and differentiated by the scan speed, to reproduce the spectrum profile of the measurement light.

Figure 10:
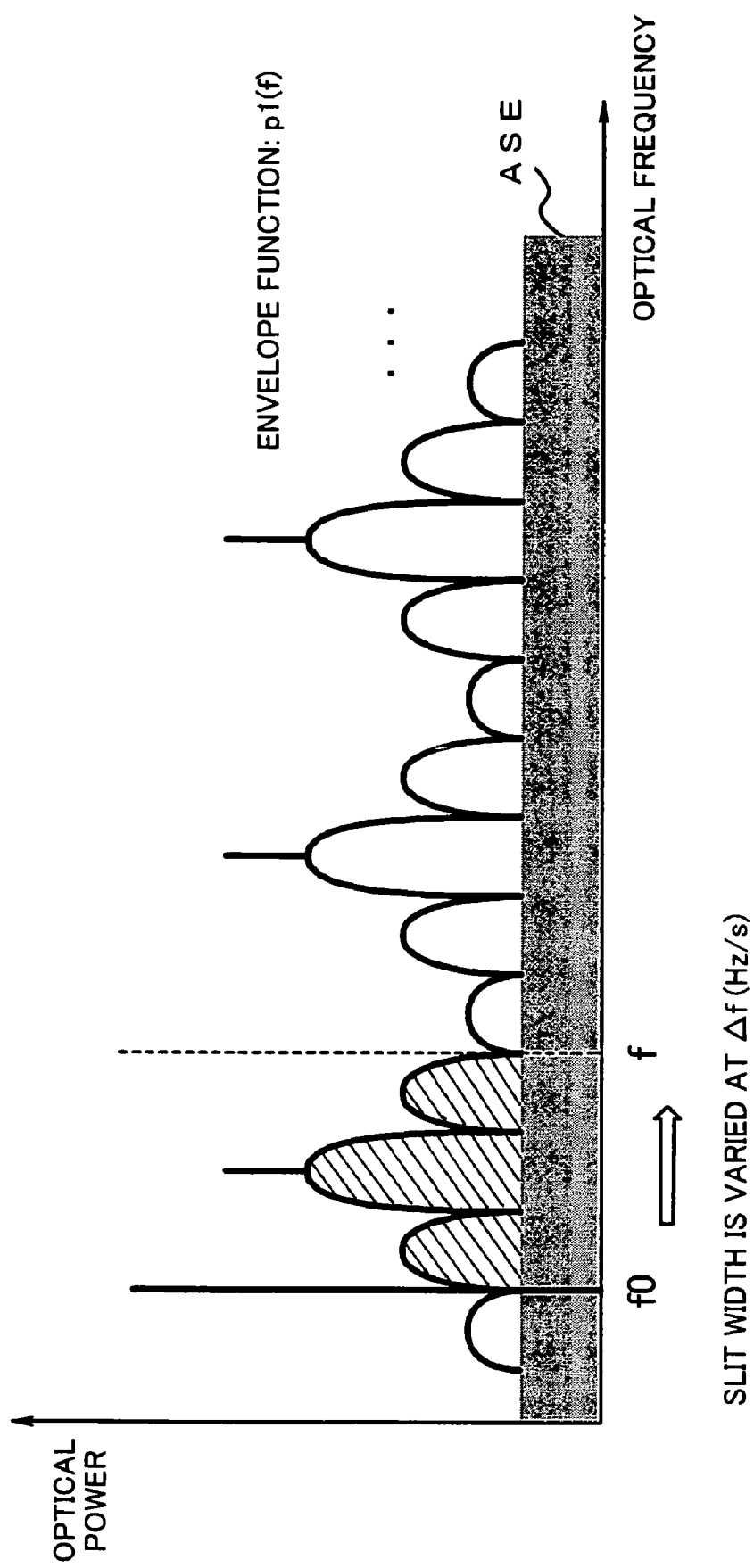
FIG. 10 is a graph showing the manner of increasing a slit width.

FIG. 10 illustrates the manner of opening the slit, wherein the vertical axis indicates optical power and the horizontal axis indicates optical frequency. With one side of the slit 15a fixed (corresponding to f0 on the optical frequency axis), the other side is moved at a scan speed of $\Delta f$ (Hz/s) (in FIG. 10, moved up to position f on the optical frequency axis).

Figure 11:
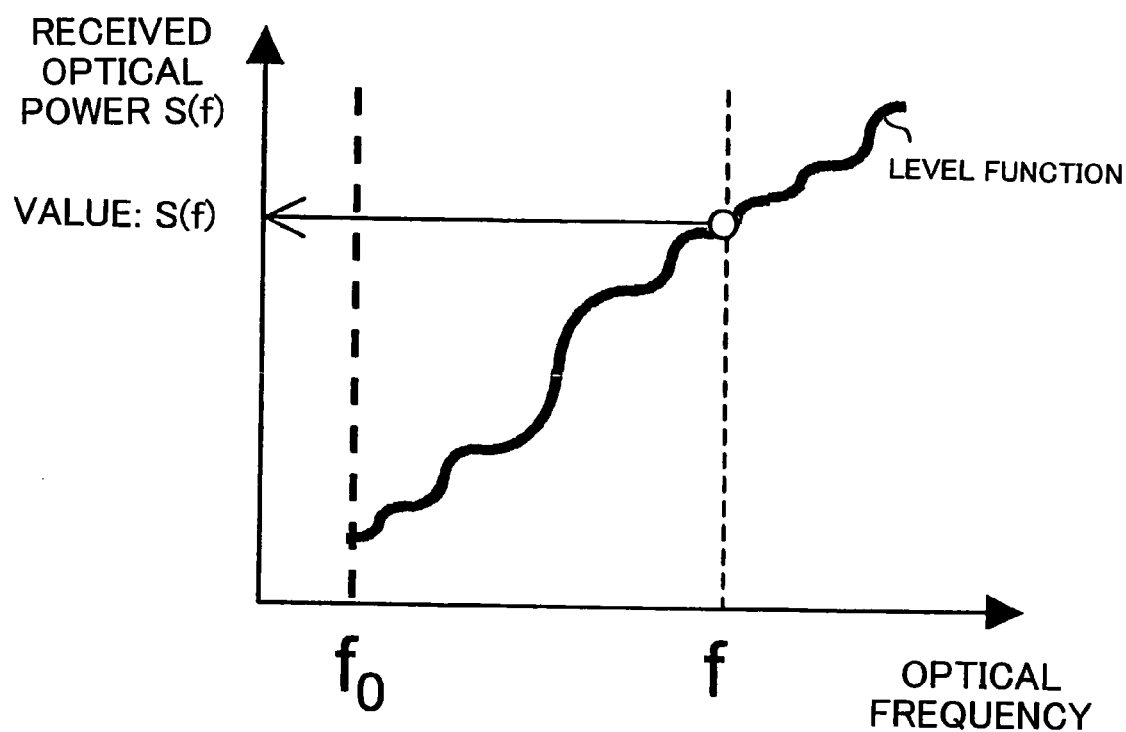
FIG. 11 is a graph illustrating a level function.

FIG. 11 illustrates the level function, wherein the vertical axis indicates received optical power and the horizontal axis indicates optical frequency. As seen from the figure, the level function S(f) is expressed as a curve which is obtained by plotting the power of the received light passed through the slit 15a as a function of the optical frequency corresponding to the scan speed.

Figure 12:
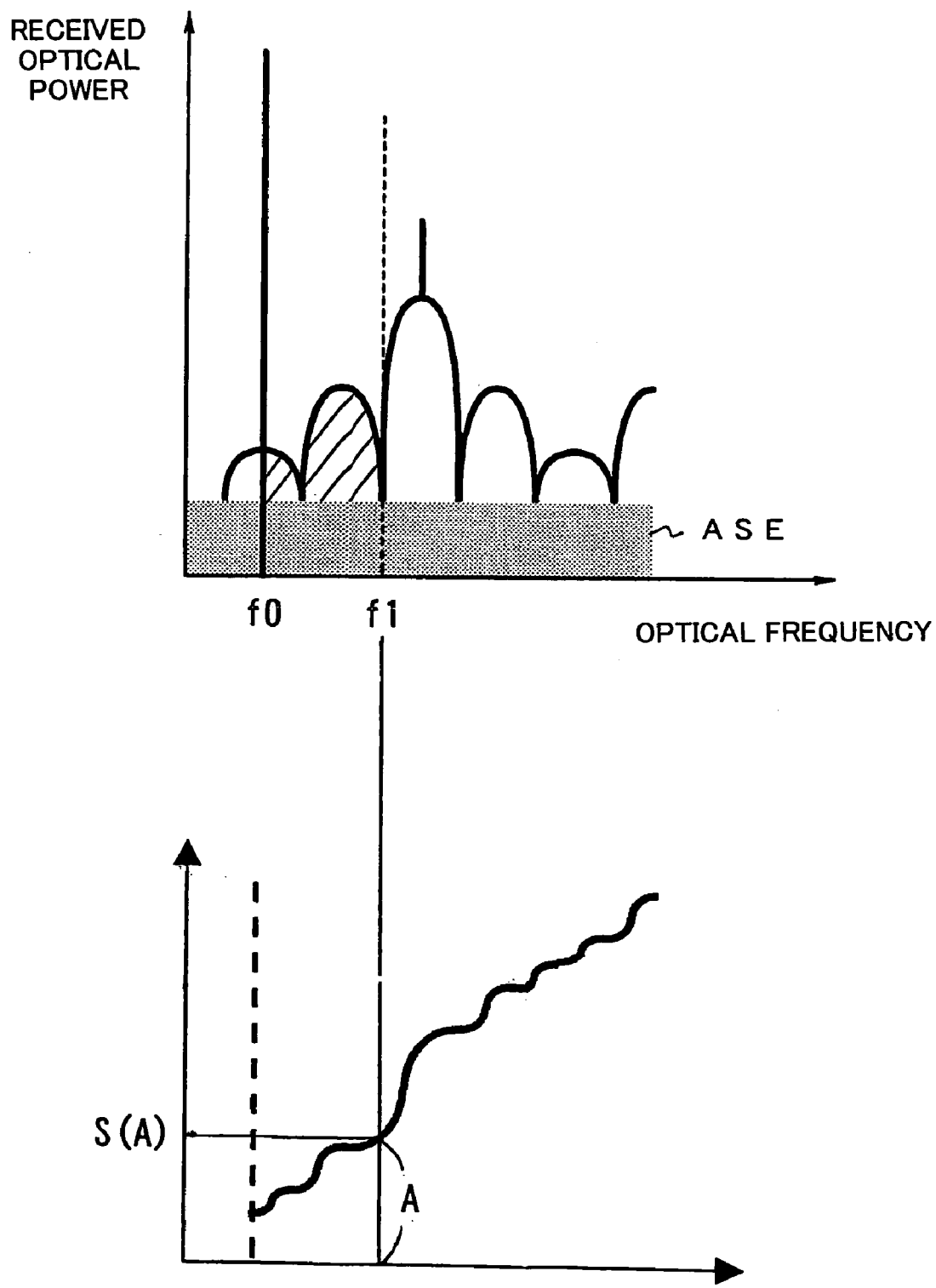
FIG. 12 illustrates the process of generating the level function.
Figure 13:
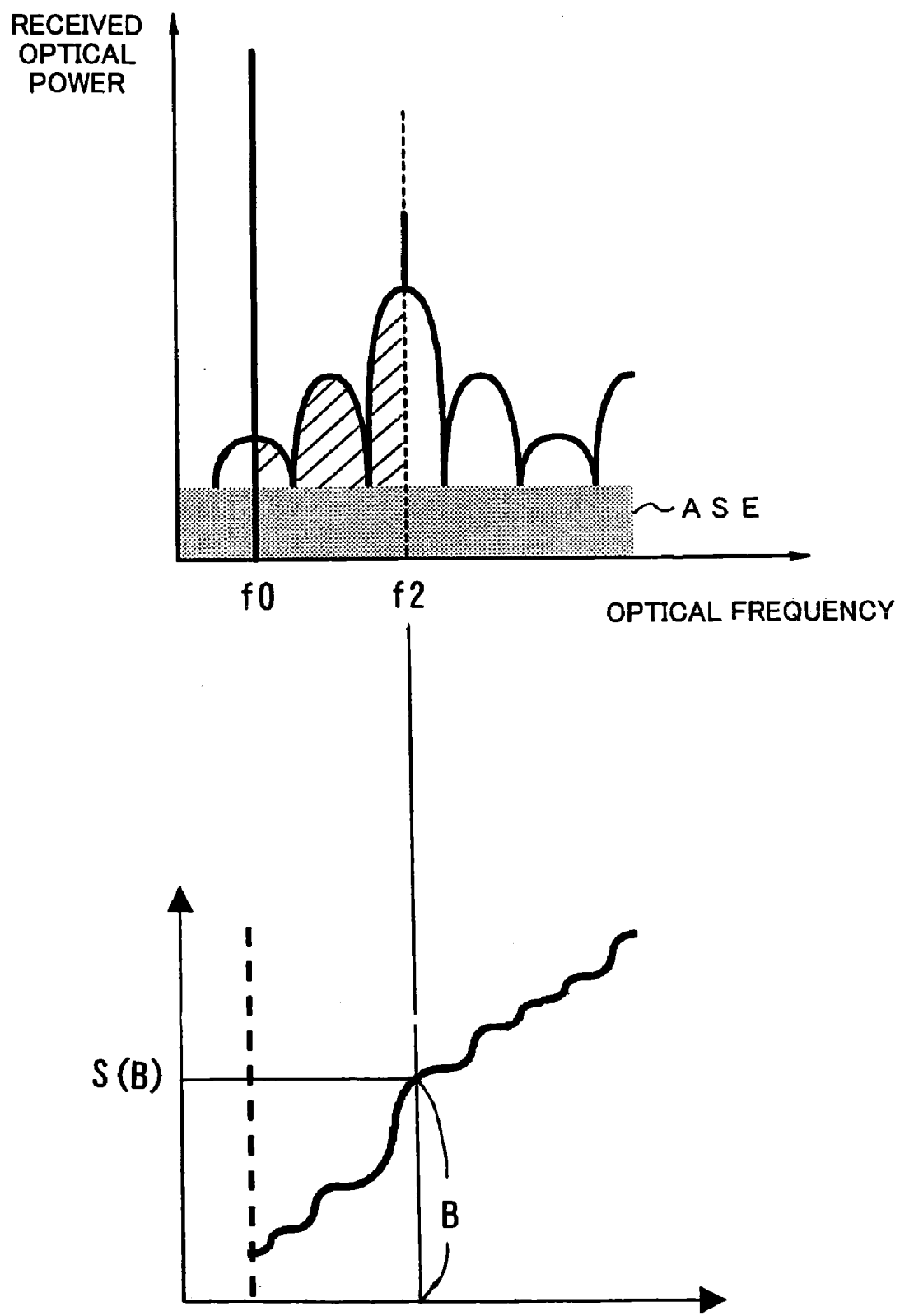
FIG. 13 also illustrates the process of generating the level function.

FIGS. 12 and 13 illustrate the process of generating the level function. When the slit is opened from the totally closed state up to f1 on the optical frequency axis which corresponds to the passing band of the slit, as shown in FIG. 12, the hatched area under the envelope of the optical spectrum corresponds to the height A (received optical power S(A)) of the level function. Also, when the slit is opened up to f2 on the optical frequency axis, as shown in FIG. 13, the hatched area under the envelope of the optical spectrum corresponds to the height B (received optical power S(B)) of the level function.

The level function indicates a gradient corresponding to the profile of the envelope. For example, in regions where the profile of the envelope shows a sudden change, the level function indicates a large gradient. At the peak of the envelope of the optical spectrum, the amount of change on the optical frequency axis is zero, and accordingly, the gradient of the level function corresponding to the peak of the envelope is flat. In the case of plotting the optical power passed through the slit, the more finely the slit width is varied (the more finely the slit is widened or narrowed), the more accurately the level function shows the gradient corresponding to the profile of the envelope.

Provided the envelope function shown in FIG. 10 is p1(f), then the area P(f) under the envelope over the slit width $\Delta f$ is given by the following equation (1), where C is an integration constant:

$$\int p1(f)df = P(f) + C \qquad (1)$$

Equation (1) is differentiated with respect to f, then equation (1) can be expressed as the following equation (2):

$$\frac{d}{df}P(f) = p1(f) \qquad (2)$$

The level function, represented by S(f), is a function obtained by integrating the function p1(f) from f0 to f, and thus can be derived by the following equation (3) (indicative of the hatched area in FIG. 10):

$$S(f) = \int_{f0}^{f} p1(f)df = P(f) - P(f0) \quad (3)$$

Figure 14:
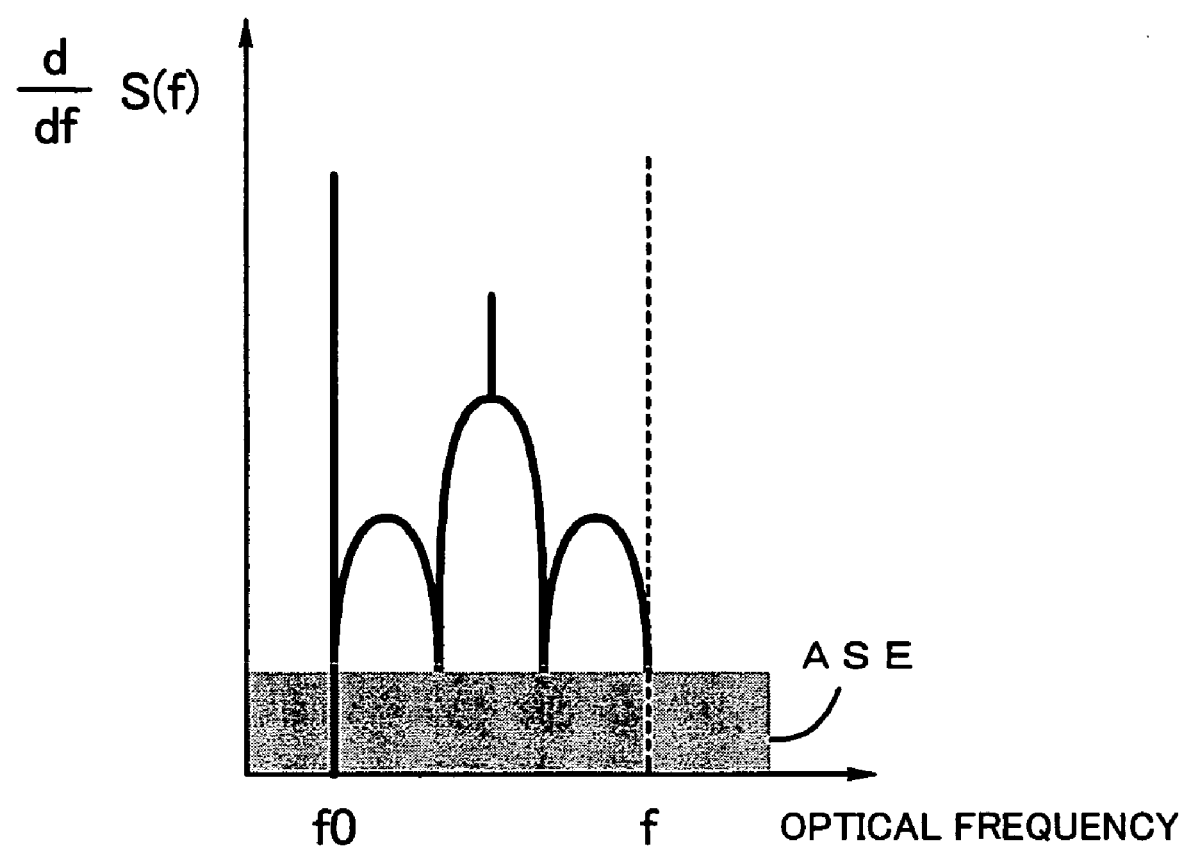
FIG. 14 is a graph showing a reproduced spectrum obtained with the slit width varied.

Subsequently, the function S(f) is differentiated with respect to f, as indicated by equation (4) below, thereby obtaining the original envelope function p1(f). FIG. 14 shows a reproduced spectrum obtained when the slit width was increased up to f.

$$\frac{d}{df}S(f) = \frac{d}{df}\{P(f) - P(f0)\} \quad (4)$$
$$= p1(f) - 0 = p1(f)$$

In this manner, according to the present invention, the slit width is increased (or decreased) at a constant scan speed to vary the passing bandwidth for the converged beam. Then, with respect to the light passed through the slit, the level function is obtained which is indicative of the level of the received optical power that varies with change in optical frequency, and is differentiated by the scan speed to reproduce the spectrum profile of the measurement light.

This makes it possible to achieve high spectral resolving power without structurally decreasing the slit width, thus permitting the original optical spectrum to be reproduced with high fidelity. When calculating the OSNR, therefore, it is possible to know with accuracy the envelope profile of the optical signal as well as the peak of the ASE power, whereby the OSNR can be obtained with remarkably high accuracy, compared with the conventional optical spectrum analyzer.

The foregoing embodiment has been described on the assumption that the slit is opened or closed at a constant speed and thus that the scan speed, which is a rate of change in the passing frequency band of the slit, is also constant. It will be apparent, however, that the slit opening/closing speed and the scan speed may not necessarily be constant.

Figure 15:
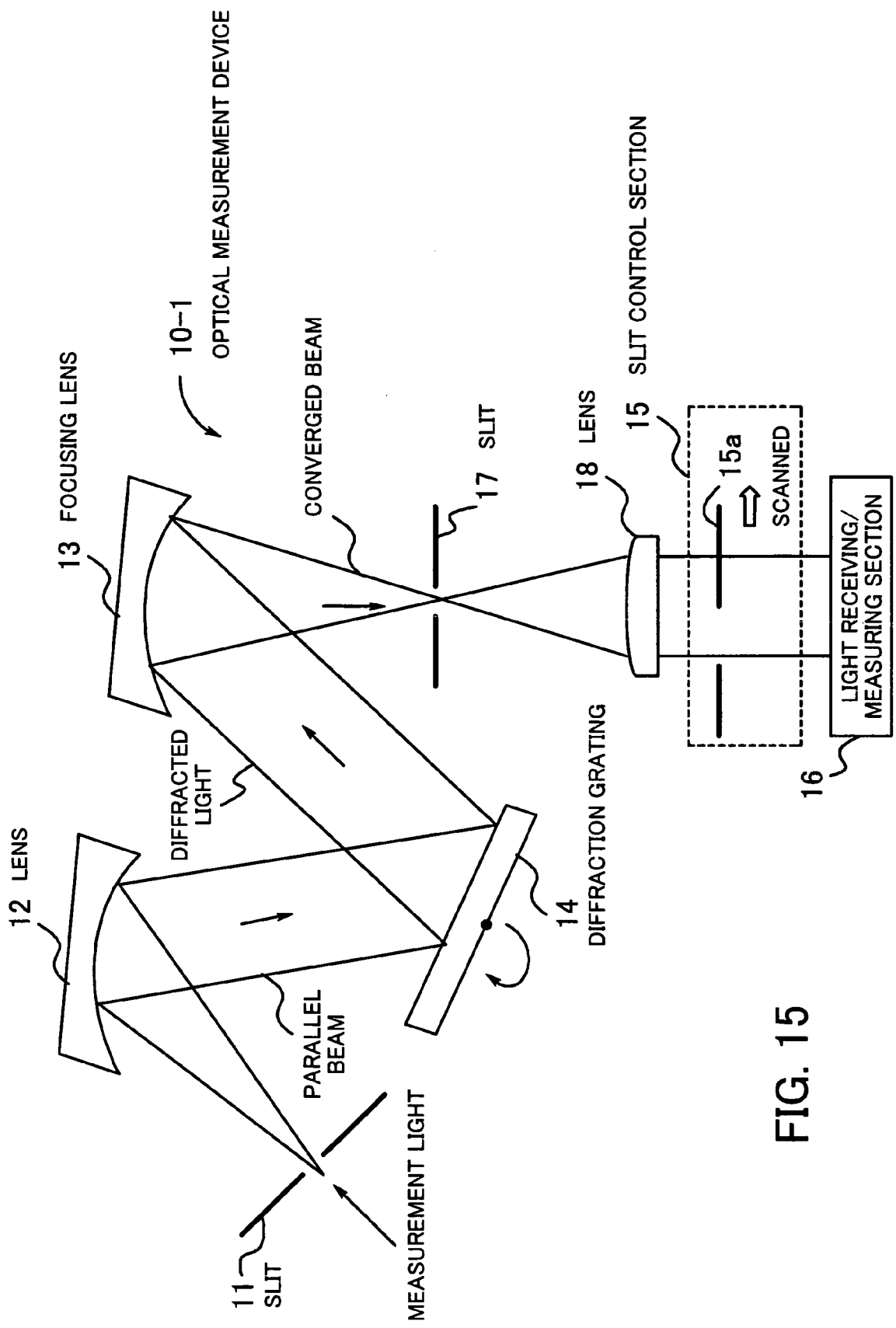
FIG. 15 is a diagram illustrating a second embodiment.

A second embodiment will be now described. FIG. 15 illustrates the second embodiment, and an optical measurement device 10-1 of this embodiment includes a slit 17 and a lens 18, in addition to the elements explained above with reference to FIG. 1. The process in operation from the incidence of measurement light onto the slit 11 to the convergence of the beam with a wavelength selected by the diffraction grating 14 is identical with that explained with reference to FIG. 1.

The slit 17 extracts a given bandwidth of light emerging from the focusing lens 13, and the lens 18 transforms the light passed through the slit 17 into a parallel beam. The slit control section 15 and the light receiving/measuring section 16 operate in the same manner as those of the optical measurement device 10 of FIG. 1.

Figure 16:
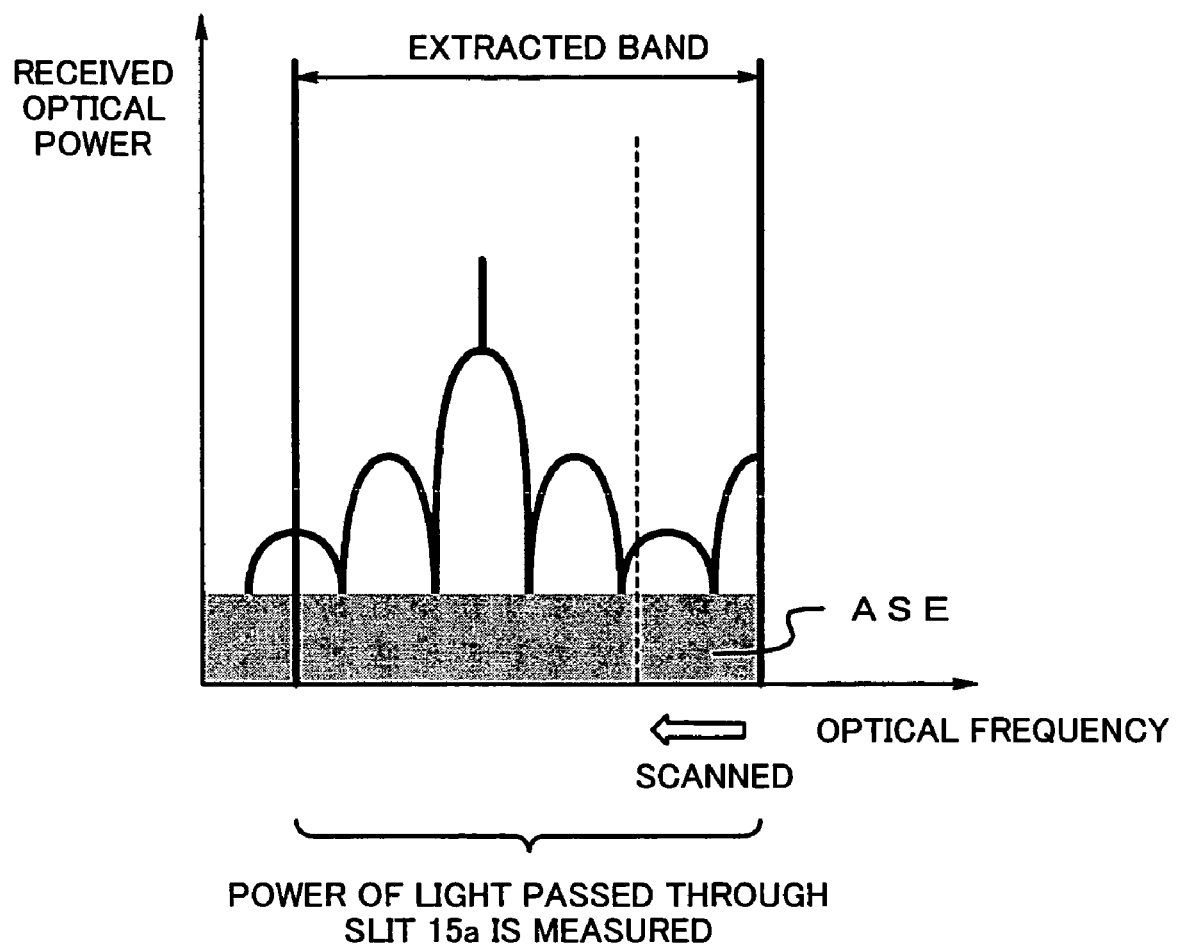
FIG. 16 is a graph illustrating measurement of optical power of a band extracted through a slit.

FIG. 16 illustrates measurement of the optical power of the band extracted through the slit 17, wherein the vertical axis indicates received optical power and the horizontal axis indicates optical frequency. As shown in FIG. 16, a given bandwidth of the optical spectrum is previously extracted through the slit 17. With the slit control section 15 adjusted such that the width of the slit 15a is variable within the extracted bandwidth, the optical spectrum is scanned, and the optical power passed through the slit is measured by the light receiving/measuring section 16.

Thus, in the second embodiment, the range of an optical spectrum bandwidth to be measured is set beforehand, and the received optical power is measured with the passing bandwidth varied within the set range. Accordingly, the measurement is performed after the range of measurement is narrowed to a certain degree, whereby the measurement efficiency can be improved (for example, only one channel of WDM signal can be easily selected so that the spectrum may be scanned by the slit within the band where the selected channel alone exists).

Figure 17:
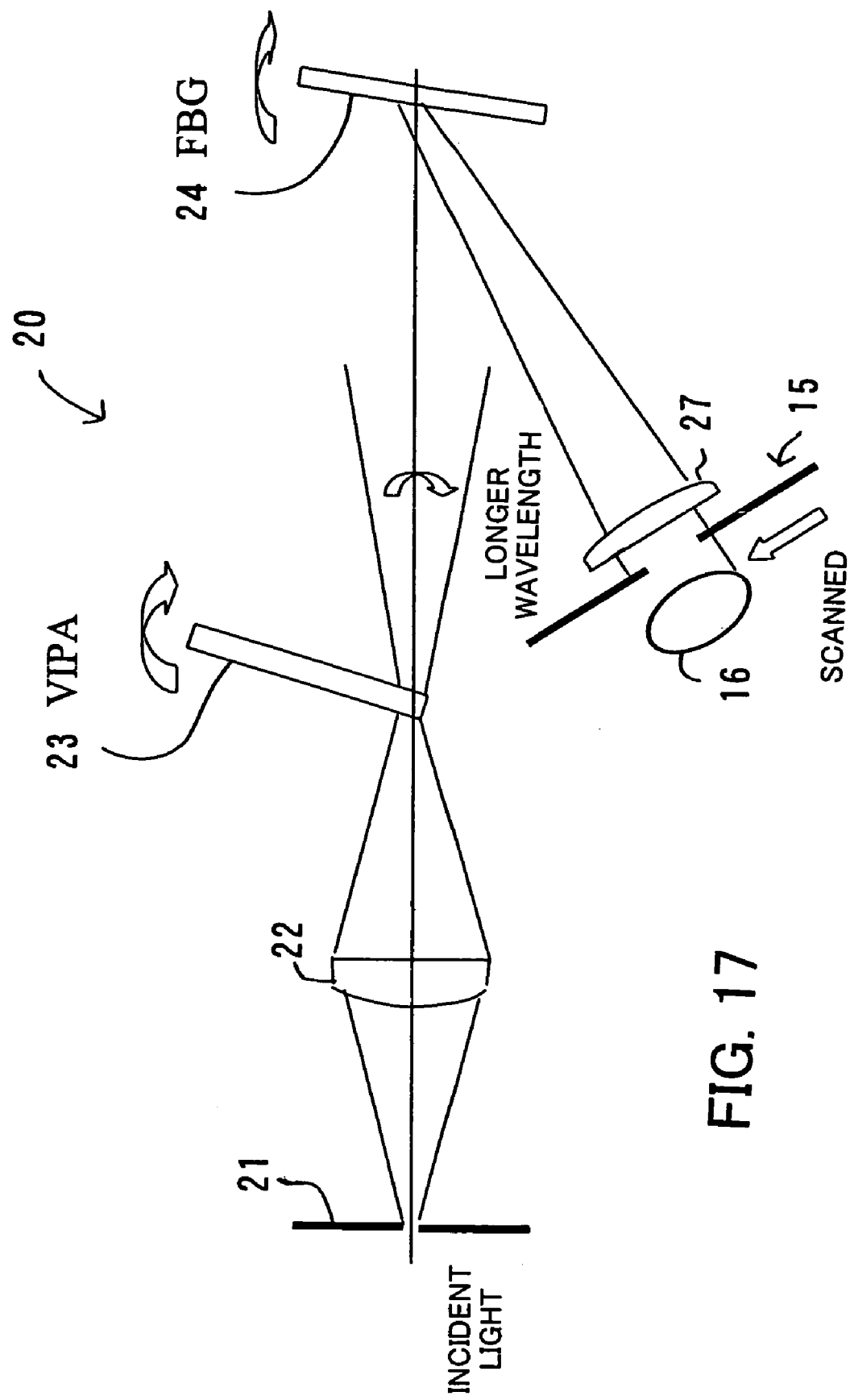
FIG. 17 is a diagram illustrating a third embodiment.

A third embodiment will be now described. FIG. 17 illustrates the third embodiment, and an optical measurement device 20 of this embodiment uses a VIPA (Virtually Imaged Phased Array) in place of the diffraction grating (VIPA is an optical component capable of dispersing light with extremely high resolving power and a schematic construction thereof will be described later with reference to FIG. 18). The use of a VIPA makes it possible to further increase the resolving power.

The optical measurement device 20 comprises a slit 21, a focusing lens 22, a VIPA 23, an FBG (Fiber Bragg Grating) 24, a lens 27, the slit control section 15, and the light receiving/measuring section 16.

After passing through the slit 21, the measurement light impinges on the lens 22 and is transformed into a converged beam. The converged beam is incident upon the VIPA 23 and is dispersed thereby into diffracted rays of respective wavelengths (frequencies). The FBG 24 converges the diffracted light from the VIPA 23 and emits light with higher wavelength selectivity (since the light emitted from the VIPA 23 is divergent diffracted light, a narrower wavelength range of light is selected and output by using the FBG 24).

The lens 27 transforms the light emerging from the FBG 24 into a parallel beam. The subsequent operation performed by the slit control section 15 and the light receiving/measuring section 16 is identical with that explained above with reference to FIG. 1. The FBG 24 may be omitted and a simpler arrangement may be employed in which the light emitted from the VIPA 23 is converged and transformed into a parallel beam by the lens 27.

Figure 18:
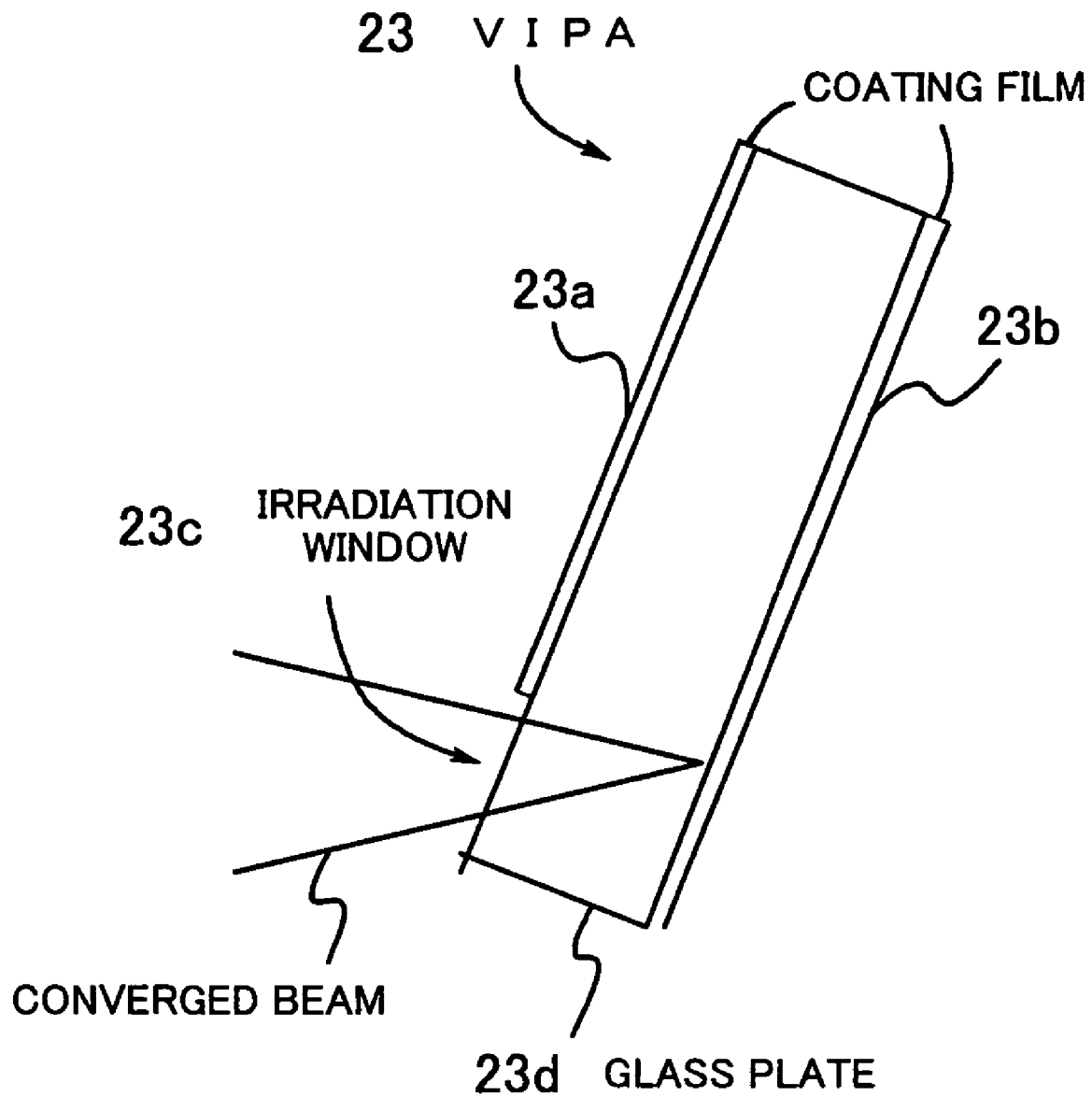
FIG. 18 is a diagram showing a VIPA.

FIG. 18 illustrates the VIPA 23. The VIPA 23 comprises a glass plate 23d which has first and second surfaces 23a and 23b having high but asymmetrical reflectivities and an irradiation window 23c onto which light is irradiated. For example, the first surface 23a is coated with a reflecting film having nearly 100% reflectivity, and the second surface 23b is coated with a reflecting film having 95 to 98% reflectivity.

The VIPA causes the incident converged beam to undergo multiple reflection in the interior thereof between the first and second surfaces 23a and 23b and emits dispersed light through the second surface 23b (shorter wavelength light is emitted from the upper side of the VIPA 23 and longer wavelength light is emitted from the lower side of same).

The VIPA 23 constructed as above disperses light into wavelengths dispersed at angles greater than those achieved by ordinary diffraction gratings and thus is capable of finely dispersing light (for details of the principle of a VIPA, see Unexamined Japanese Patent Publication No. 2000-28849 etc.).

Figure 19:
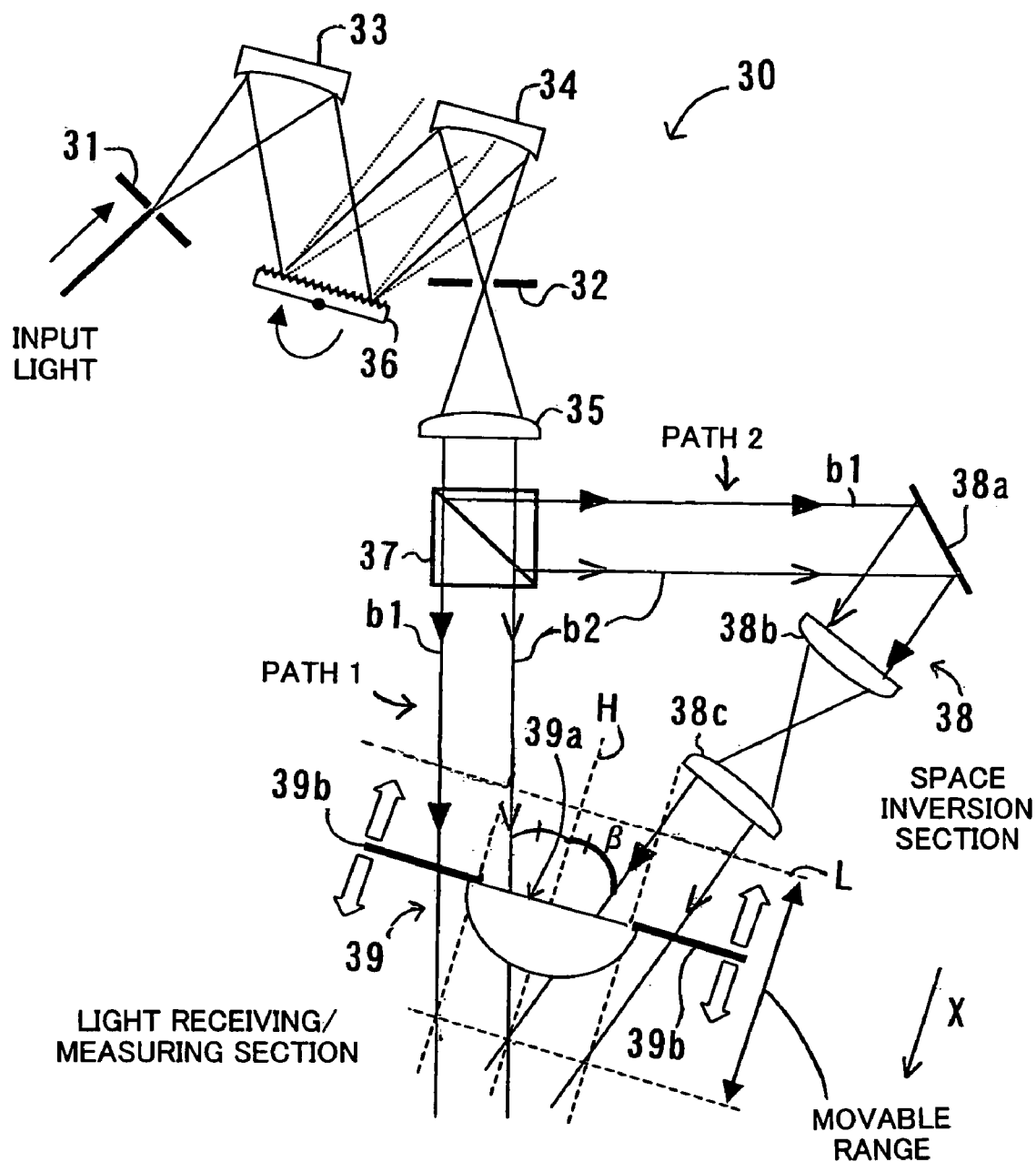
FIG. 19 is a diagram illustrating a modification.

A modification of the present invention will be now described. FIG. 19 illustrates the modification, and an optical measurement device 30 according to the modification measures optical power with the measurement bandwidth varied by moving the light receiving/measuring section, instead of varying the slit width.

The optical measurement device 30 comprises slits 31 and 32, lenses 33 to 35, a diffraction grating 36, a beam splitter 37, a space inversion section 38, and a light receiving/measuring section 39. The space inversion section 38 includes a reflecting plate 38a and lenses 38b and 38c. Also, the light receiving/measuring section 39 has a cutoff slit element 39b provided on each side of a light receiving surface 39a thereof for cutting off light.

After passing through the slit 31, the measurement light is reflected and transformed into a parallel beam by the lens 33. The parallel beam impinges on the diffraction grating 36 and is dispersed thereby, thus producing diffracted rays of respective wavelengths (frequencies). The focusing lens 34 converges the diffracted light to obtain a converged beam, and the slit 32 extracts a given bandwidth of the converged beam emerging from the focusing lens 34. The lens 35 transforms the light passed through the slit 32 into a parallel beam (operation up to this stage is identical with that performed in the second embodiment, and the diffraction grating 36 may be replaced with a VIPA).

The beam splitter 37 splits the parallel beam (the power split ratio may be 1:1) into two split beams. One split beam is directed to the space inversion section 38 while the other is directed to the light receiving/measuring section 39.

In the space inversion section 38, the reflecting plate 38a reflects the split beam incident thereon and the lenses 38b and 38c subject the image of the reflected beam to right/left inversion. The inverted beam is directed to the light receiving/measuring section 39. Accordingly, the non-inverted beam (hereinafter called path 1) emitted from the beam splitter 37 and the inverted beam (hereinafter called path 2) emitted from the space inversion section 38 are laterally symmetrical on the frequency axis, which beams are then introduced into the light receiving/measuring section 39 (at a given angle of incidence).

The light receiving/measuring section 39 is arranged at the point of interference between the paths 1 and 2 and is movable along a perpendicular line H extending perpendicularly to the light receiving surface 39a from a position such that the interfering beams traveling along the paths 1 and 2 form an angle of β with respect to the perpendicular line, to thereby vary the bandwidth to be measured.

The movable range is set such that when the light receiving surface 39a is located on a line L, for example, the beams traveling along the paths 1 and 2 do not fall upon the light receiving surface 39a. As the light receiving surface 39a is moved downward (in the direction of arrow X) from the line L along the perpendicular line H, the beams traveling along the paths 1 and 2 begin to fall, by degrees, upon the light receiving surface 39a at an angle thereto (the cutoff slit elements 39b are arranged on both sides of the light receiving surface 39a so that only the beams traveling along the paths 1 and 2 may be received).

With respect to the beams received from the paths 1 and 2, the light receiving/measuring section 39 obtains the level function indicative of the level of the received optical power that varies with change in frequency, and then differentiates the level function by the scan speed to reproduce the spectrum profile of the measurement light.

Figure 20:
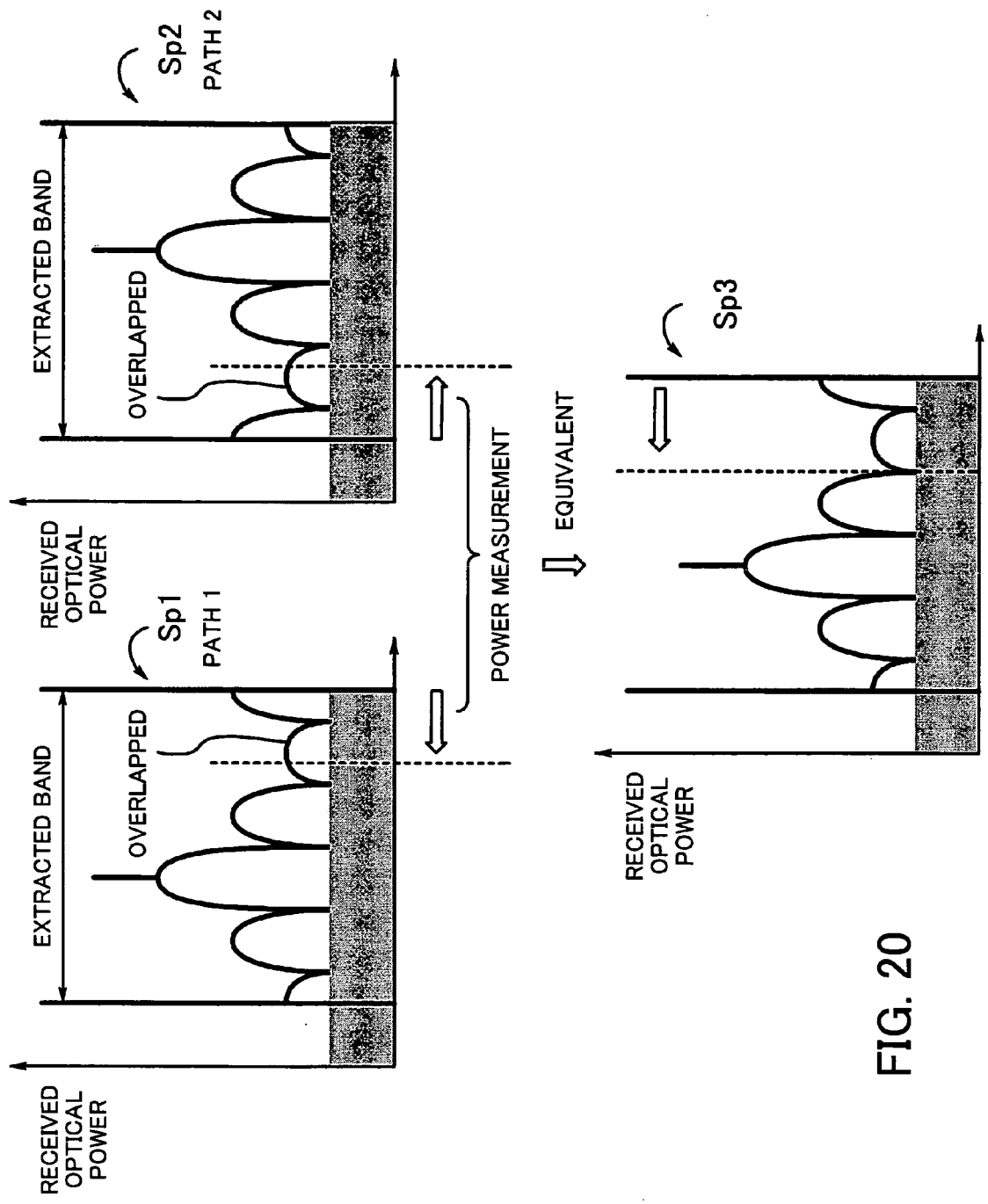
FIG. 20 illustrates operation of the modification.
Figure 21:
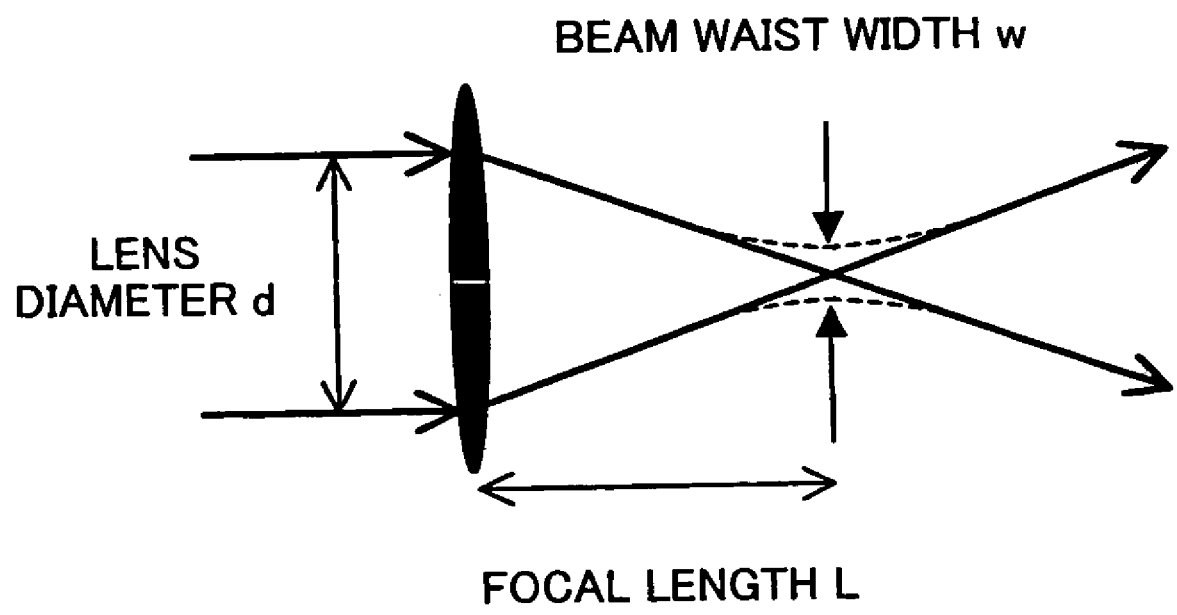
FIG. 21 is a diagram illustrating the width of a beam waist formed by a lens.
Figure 22:
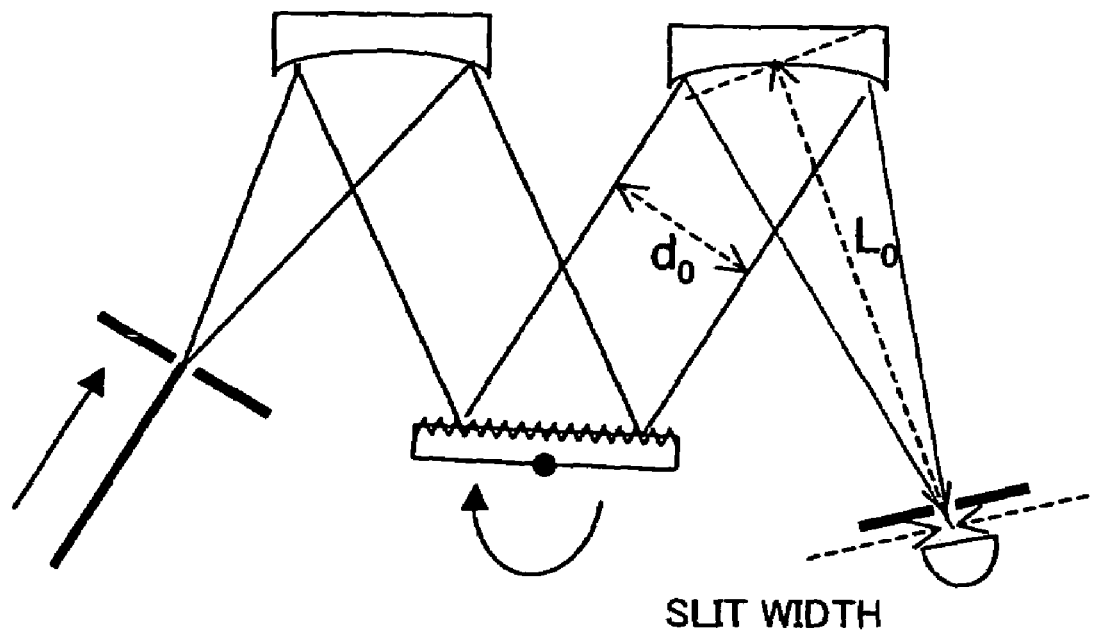
FIG. 22 is a diagram showing the arrangement of a spectrum analyzer.

FIG. 20 illustrates the operation according to the modification. FIG. 20 shows the states of optical spectra Sp1 and Sp2 of the paths 1 and 2, respectively, incident on the light receiving surface 39a, and as illustrated, the spectra are in the relationship of lateral symmetry on the frequency axis. Also, FIG. 20 shows the envelope within the band extracted through the slit 32. The envelope indicated by the dotted line corresponds to the beam part b1 shown in FIG. 19, and the envelope indicated by the solid line corresponds to the beam part b2 shown in FIG. 19 (the region where the envelope of the beam part b1 overlaps the envelope of the beam part b2 is indicated by the solid line).

As the light receiving/measuring section 39 is moved, the measurement band widens in the directions indicated by the arrows in FIG. 20. Thus, the level of the received optical power within the variable band indicated by the arrows (the level of the power via the path 1 plus the power via the path 2) is measured, the level function is obtained, and computations indicated by the aforementioned equations (1) to (4) are performed. This is equivalently shown as an optical spectrum Sp3 in FIG. 10. The operation of the optical measurement device 30 is apparently the same as varying the slit width, shown in FIG. 10.

Thus, in the optical measurement device 30 according to the modification, the light receiving/measuring section 39 is moved, instead of opening/closing the slit, to obtain advantageous effects identical with those achieved by the device shown in FIG. 1. In the first to third embodiments, the spectrum is scanned with the slit width varied, and therefore, the slit needs to be finely moved. On the other hand, in the modification, the spectrum can be scanned at fine frequency intervals by decreasing the angle β at which the two beams traveling along the paths 1 and 2 are made to be incident for interference. Accordingly, the mechanism can be easily constructed and it is also easier to measure the amount of change with high resolving power.

As described above, according to the present invention, the slit width is varied at a constant scan speed to vary the passing bandwidth for the converged beam. Then, with respect to the light passed through the slit, the level function is obtained which is indicative of the level of the received optical power that varies with change in optical frequency, and is differentiated with respect to the scan speed, to reproduce the spectrum profile of the measurement light.

With the conventional methods, it is practically impossible to locate the bottom of the envelope (peak of the ASE power) since there is a limit to the slit width, with the result that the OSNR cannot be measured with accuracy. On the other hand, the present invention has the function of reproducing the original spectrum of the measurement light and thus can locate the bottom of the envelope, making it possible to measure the OSNR with accuracy.

In the foregoing description, OSNR is chiefly mentioned as a characteristic to be measured. According to the present invention, however, since the spectrum of the measurement light can be reproduced, various other measurements including waveform analysis and gain measurement, besides OSNR measurement, can be performed with high accuracy.

With the optical measurement device of the present invention, an optical spectrum can be measured with high resolving power, without the need to structurally decrease the slit width, whereby the optical spectrum measurement accuracy can be improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical measurement device for measuring an optical spectrum, comprising:
    a diffraction grating for dispersing measurement light to be measured, to produce diffracted light of selected wavelengths;
    a focusing lens for converging the diffracted light to produce a converged beam;
    a slit for passing part of the converged beam as incident light therethrough;
    a slit control section for varying a slit width of said slit at a scan speed to open or close said slit, thereby varying a passing bandwidth for the incident light, the scan speed being indicative of an optical frequency change per unit time; and
    a light receiving/measuring section for measuring power of received light passed through said slit, obtaining a level function which is indicative of a gradient corresponding to a profile of an envelope of the optical spectrum corresponding to change in optical frequency, and differentiating the level function with respect to the scan speed to reproduce a spectrum profile of the measurement light.

2. The optical measurement device according to claim 1, wherein said light receiving/measuring section obtains total power of an optical signal and ASE power within a fixed wavelength range from the reproduced spectrum profile, to calculate an OSNR.

* * * * *